(12) United States Patent
Carr

(10) Patent No.: US 8,253,730 B1
(45) Date of Patent: Aug. 28, 2012

(54) SYSTEM AND METHOD FOR CONSTRUCTION OF DATA STRUCTURES FOR RAY TRACING USING BOUNDING HIERARCHIES

(75) Inventor: Nathan A. Carr, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1034 days.

(21) Appl. No.: 12/201,847

(22) Filed: Aug. 29, 2008

(51) Int. Cl.
*G06T 15/00* (2011.01)
*G06T 15/06* (2011.01)

(52) U.S. Cl. ........................................... 345/419

(58) Field of Classification Search ............... None
See application file for complete search history.

(56) References Cited

U.S. PATENT DOCUMENTS

| | | | | |
|---|---|---|---|---|
| 5,305,430 | A * | 4/1994 | Glassner | 345/427 |
| 6,868,420 | B2 * | 3/2005 | Perry et al. | 707/743 |
| 7,012,604 | B1 * | 3/2006 | Christie et al. | 345/426 |
| 7,164,420 | B2 * | 1/2007 | Ard | 345/423 |
| 2003/0117397 | A1 * | 6/2003 | Hubrecht et al. | 345/420 |
| 2006/0139349 | A1 | 6/2006 | Reshetov et al. | |
| 2007/0024615 | A1 * | 2/2007 | Keller et al. | 345/421 |
| 2008/0024489 | A1 * | 1/2008 | Shearer | 345/421 |
| 2008/0043018 | A1 * | 2/2008 | Keller et al. | 345/426 |
| 2008/0049016 | A1 * | 2/2008 | Shearer | 345/421 |
| 2008/0122838 | A1 * | 5/2008 | Hoover et al. | 345/420 |
| 2008/0150944 | A1 | 6/2008 | Reshetov et al. | |
| 2008/0192054 | A1 | 8/2008 | Fowler et al. | |

OTHER PUBLICATIONS

Fast Lazy Build of Acceleration Structures from Scene Hierarchies. Warren Hunt, William Mark, Donald Fussell. Proceedings of IEEE Symposium on Interactive Ray Tracing. Sep. 2007. pp. 47-54.
Erik Reinhard, Brian E. Smits, and Chuck Hansen. 2000. Dynamic Acceleration Structures for Interactive Ray Tracing. In Proceedings of the Eurographics Workshop on Rendering Techniques 2000, Bernard Peroche and Holly E. Rushmeier (Eds.). Springer-Verlag, London, UK, 299-306.
Ray-Specialized Acceleration Structures for Ray Tracing. Warren Hunt and William R. Mark. Proceedings of IEEE/EG Symposium on Interactive Ray Tracing, Aug. 2008. pp. 3-10.
R. Sedgewick, Implementing quicksort programs, Comm. ACM, 21(10):847-857, 1978. Robert Sedgewick. 1978. Implementing Quicksort programs. Commun. ACM 21, 10 (Oct. 1978), pp. 847-857.

* cited by examiner

*Primary Examiner* — Edward Martello
(74) *Attorney, Agent, or Firm* — Robert C. Kowert; Meyertons, Hood, Kivlin, Kowert & Goetzel, P.C.

(57) ABSTRACT

A method, system, and computer-readable storage medium are disclosed for building ray tracing data structures for three-dimensional scenes. The methods may include accessing an initial data structure representing a coarse hierarchy of a scene geometry, e.g., a scene graph, and sorting elements of the initial data structure into multiple spatial partitions with respect to one or more splitting planes. The sorting may be dependent on spatial bounding ranges of non-leaf nodes of the initial data structure, which may be sorted without visiting the geometric primitives below. Sorting may be performed on pointers to elements of the initial data structure and may comprise a hierarchical quicksort. The resulting ray tracing data structure may comprise a k-dimensional tree, binary space partitioning tree, k-plane tree, bounding interval hierarchy, or fine-grained hierarchical bounding volume tree. The methods described herein may accelerate the building of ray tracing data structures for use in interactive graphics applications.

30 Claims, 16 Drawing Sheets

SYSTEM AND METHOD FOR CONSTRUCTION OF DATA STRUCTURES FOR RAY TRACING USING BOUNDING HIERARCHIES

BACKGROUND

1. Field of the Invention

The present invention is directed to computer systems; and more particularly, it is directed to the use of data structures to accelerate ray tracing computations using computer systems.

2. Description of the Related Art

As the power and complexity of personal computer systems increase, graphics operations are increasingly being performed using dedicated graphics rendering devices referred to as graphics processing units (GPUs). As used herein, the terms "graphics processing unit" and "graphics processor" are used interchangeably. GPUs are often used in removable graphics cards that are coupled to a motherboard via a standardized bus (e.g., AGP or PCI Express). GPUs may also be used in game consoles and in integrated graphics solutions (e.g., for use in some portable computers and lower-cost desktop computers). Although GPUs vary in their capabilities, they may typically be used to perform such tasks as rendering of two-dimensional (2D) graphical data, rendering of three-dimensional (3D) graphical data, accelerated rendering of graphical user interface (GUI) display elements, and digital video playback. A GPU may include various built-in and configurable structures for rendering digital images to an imaging device. Digital images may include raster graphics, vector graphics, or a combination thereof. A GPU may include facilities for parallel processing of appropriate data sets. A GPU may implement one or more application programmer interfaces (APIs) that permit programmers to invoke the functionality of the GPU. In addition to GPUs, multi-core processors and multi-processor computer systems may offer additional platforms for parallel computation of graphics-related data. Accordingly, it is desirable to use algorithms that can scale in a parallel processing environment.

Ray tracing is a popular graphics algorithm that has been shown to scale nearly linearly with the number of available processors or cores. However, ray tracing has seen limited use in the interactive space. Current GPU rendering algorithms may adeptly handle basic rendering effects such as shadowing. These algorithms, however, are typically linear in the geometry complexity of the scene. Thus, as the geometry of a scene becomes more complicated and as more realistic effects become desired, ray tracing becomes a more valuable approach.

A ray tracing algorithm may use a spatial database to store objects in a three-dimensional scene. Typically, this data structure is optimized for performing a ray tracing query: that is, given a ray in space, what is the first object that the ray intersects? A simplistic implementation of such a database may yield O(n) performance per database query, where n is the number of objects in the scene. However, by clustering nearby objects together and bounding the region of space that they occupy, simple tests may be used to cull away large amounts of geometry. By building hierarchies of these bounded regions in space, the overall running time for performing a query may be reduced (e.g., to approximately $O(\log_2 n)$ for typical scenes). Spatial database structures usable for ray tracing can be broken down into two primary categories: spatial partitioning methods and bounding volume methods.

A spatial partitioning scheme partitions space into disjoint regions, usually by choosing a plane at each subdivision level that splits the current region into two sub-regions. In the category of spatial partitioning methods, the k-dimensional tree, or kd-tree, is one of the most popular and efficient structures for ray tracing on the CPU. In the context of ray tracing, the chosen splitting planes are aligned along the x, y, or z coordinate axis (i.e., axis-aligned). A kd-tree has three major benefits in the context of ray tracing. First, the storage per split is small and requires only a specified axis (i.e., the x, y, or z axis, typically expressed in 2 bits) and a location along the axis (typically expressed in a single floating point value). Second, traversal may be relatively fast because only ray-plane intersection against axis-aligned planes is determined. Finally, tree constructions may be relatively simple because only three splitting axes are involved.

A spatial partitioning scheme using arbitrary placement of splitting planes in space may be implemented with BSP trees (binary space partitioning trees). However, a BSP tree typically requires more data to be stored at each partition (e.g., a plane expressed as four floating point values). Thus, the BSP tree may be four times as costly as a kd-tree in its use of storage and bandwidth. Additionally, traversal is expensive because a division operation must be performed to intersect a ray with an arbitrary plane. Finally, the process of building a BSP tree may be more complex because a larger degree of freedom is permitted in choosing the locations of splitting planes.

Bounding volume methods may break space into sub-regions that may or may not overlap in space. A simple example of such a scheme uses hierarchies of axis-aligned bounding boxes (AABBs) or spheres to bound the geometry in a scene. An AABB stores minimum and maximum bounds along three coordinate axes (x, y, and z). Because bounding boxes and spheres are limited in how tightly they bound geometry, hierarchies of structures called k-dops (k-discrete oriented polytopes) have also been used to bound geometry. A k-dop is a generalization of an AABB. However, a k-dop may require a large amount of storage. Furthermore, each split may be relatively costly because it requires storing two entirely new bounding volumes.

Recently, incremental bounding volume hierarchy structures, such as box trees and bounding interval hierarchies (e.g., BIH-trees, SKD-trees, RBSP-trees, and kp-trees), have been proposed. To avoid storing an entirely new bounding volume at each node, child bounding volumes may represent incremental updates to their parent bounding volume along a given axis. Thus, a split of a parent volume involves choosing an axis along which to split and choosing two locations along this axis. In contrast to a kd-tree, the choice of two planes allows the two children to overlap in space. In this manner, triangles do not need to be split or clipped against a splitting plane as is done in the construction of an efficient kd-tree. Additionally, triangles need not be stored in multiple locations in the tree, thereby reducing memory overhead. However, traversal (e.g., for a ray tracing query) does not terminate at the first triangle intersection in a node. If the intersection point occurs in the overlap region, the right child of the parent should also be checked for intersection. Therefore, traversal may be slower.

Ray tracing requires high quality data structures, such as those described above, to achieve optimal efficiency during rendering. In a dynamic scene, however, these data structures must be updated or rebuilt each frame. Much research has gone into this area, and to date it has been shown to be better to rebuild the data-structures from scratch than to track changes using incremental updates. Incremental updates have been shown to be difficult to construct and/or maintain, and the resulting structures are inferior to those of a complete rebuild.

SUMMARY

Various embodiments of systems, methods, and computer-readable storage media for building high quality ray tracing data structures for three-dimensional scenes are disclosed. In some embodiments, the methods may include accessing an initial data structure representing a coarse hierarchy of three-dimensional scene geometry, such as a scene graph and/or a bounding volume hierarchy. The initial data structure may include leaf nodes and non-leaf nodes (e.g., h-nodes). The h-nodes may represent collections of geometric primitives, and may include a spatial bounding range of the geometric primitives below, and/or a count of the number of geometric primitives below. The spatial bounding range may in different embodiments be represented in the initial data structure by a bounding box, a bounding sphere, a bounding cylinder, a discrete oriented polytope, or any other suitable bounding volume primitive. If an initial data structure representing a coarse hierarchy is not available, the methods may include construction of such a data structure, in some embodiments.

In some embodiments, the methods may include sorting elements of the initial data structure into multiple spatial partitions with respect to one or more splitting planes. The sorting may be dependent, at least in part, on the spatial bounding ranges of the h-nodes, which may be sorted with respect to the splitting planes without visiting the geometric primitives below. The sorting may in some embodiments be performed on pointers to the elements of the initial data structure, rather than on the elements themselves. The sorting may comprise a hierarchical quicksort of the elements of the initial data structure or of pointers thereto. The sorted elements may be stored in a ray tracing data structure, such as a k-dimensional tree, a binary space partitioning tree, a k-plane tree, a bounding interval hierarchy, or a fine-grained hierarchical bounding volume tree. Each h-node of the ray tracing data structure may encode and store a location of a corresponding splitting plane, an axis of the corresponding plane, and an offset to two child nodes with respect to the corresponding splitting plane. Each leaf node of the ray tracing structure may represent one or a small number of geometric primitives in the scene geometry.

The methods described herein may accelerate the building and/or rebuilding of high quality ray tracing data structures, such that it may be possible to build and/or rebuild them during execution of interactive graphics applications (e.g., 3D games, CAD programs and/or modeling applications) as a scene changes. These ray tracing data structures may thus be used in solving ray tracing queries for rays as part of the execution of such applications. For example, a method for solving a ray tracing query may include traversing the ray tracing data structure to identify the first geometric primitive in the scene that is intersected by the ray.

The methods described herein may be implemented as program instructions, (e.g., stored on computer-readable storage media) executable by a CPU and/or GPU, in various embodiments. For example, they may be implemented as program instructions that, when executed, implement building a high quality data structure as a stand-alone operation or in conjunction with execution of a ray tracing operation in a graphics application, in different embodiments.

Figure 1:
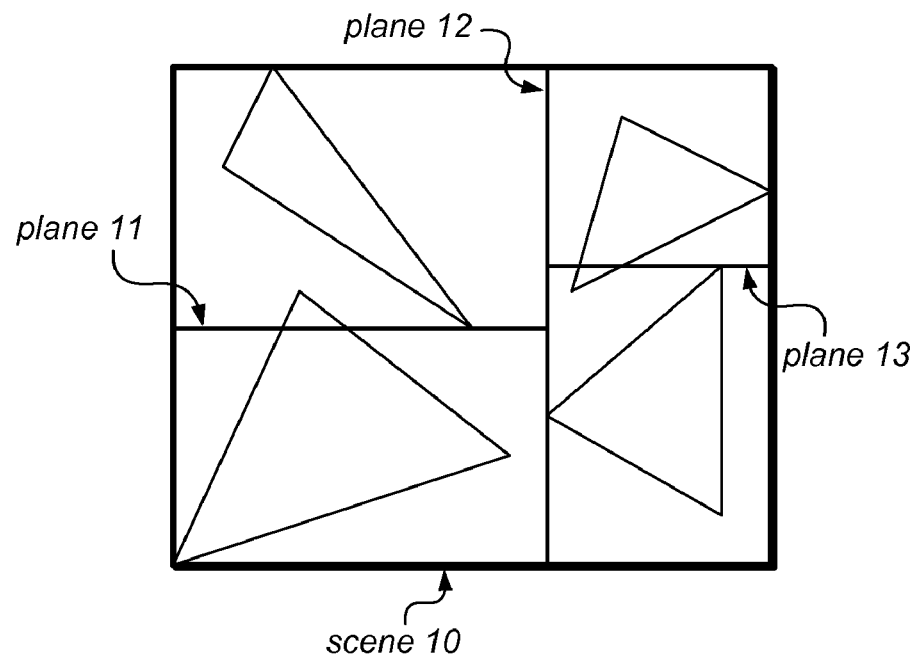
FIG. 1 illustrates an example of a scene partitioned using a kd-tree, which may be constructed according to various embodiments.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Using embodiments of the systems and methods described herein, ray tracing operations (e.g., ray tracing queries) used in the rendering of three-dimensional (3D) graphics may be accelerated by building space partitioning data structures more quickly than when using traditional methods. The space partitioning and/or hierarchical volume data structures may in some embodiments be built from available initial data structures representing a coarse hierarchy of scene elements, such as a bounding volume hierarchy, or BVH. The improved speed at which the data structures are built may in some embodiments allow them to be rebuilt as needed during execution of interactive graphics applications (e.g., 3D games, CAD programs, or modeling applications).

As described above, a ray tracing algorithm may use a spatial database to store objects in a three-dimensional scene, and this data structure may be optimized for performing a ray tracing query. Spatial database structures usable for ray tracing include structures in two primary categories: those used in spatial partitioning methods and those used in bounding volume methods. Spatial partitioning is typically based on binary tree construction, which involves dividing the list of elements of the scene into two separate lists based on a chosen split. This process is recursively applied to construct the entire tree. The split determines which elements are on the left or right. Typically the split is defined to be a plane in space. Kd-trees, for example, use a single axis aligned splitting plane. Choosing a split is very similar to choosing a pivot in quick sort, as described in more detail below.

Figure 2:
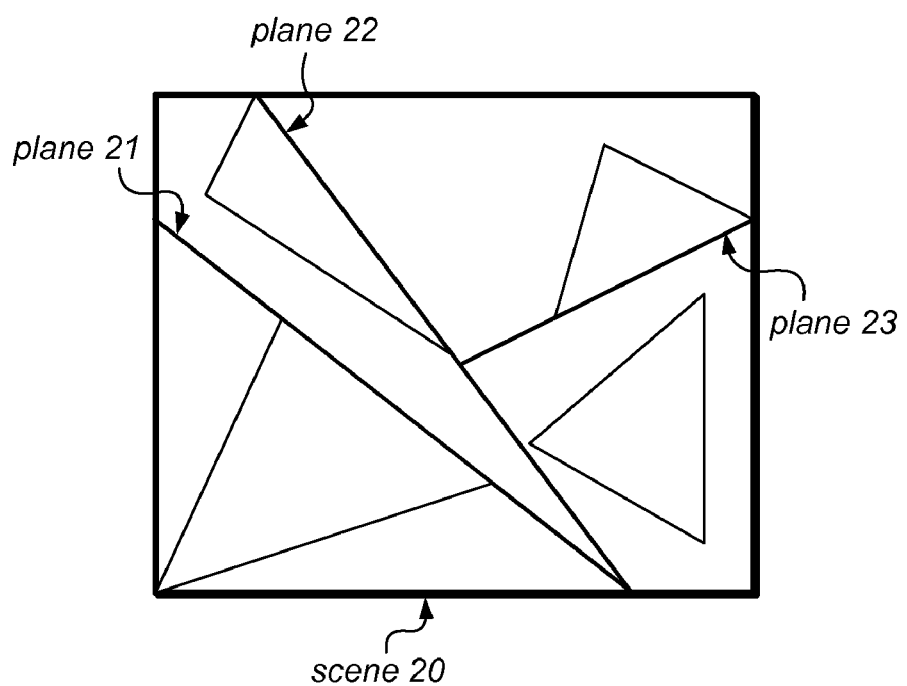
FIG. 2 illustrates an example of a scene partitioned using a BSP tree, which may be constructed according to various embodiments.

The methods described herein for accelerating the building of ray tracing data structures may be applied to various types of data structures, including those used in spatial partitioning methods and those used in bounding volume methods. FIG. 1 illustrates an example of a scene 10 partitioned using a kd-tree, according to one embodiment. For purposes of illustration, a two-dimensional view of the scene 10 is shown. Each of the three splitting planes 11, 12, and 13 is aligned along the x, y, or z axis, in this example. In a kd-tree, an object may be referenced in multiple boxes at the same level of the hierarchy (e.g., if the object straddles a splitting plane). FIG. 2 illustrates an example of a similar scene 20 partitioned using a BSP tree, according to one embodiment. For purposes of illustration, a two-dimensional view of the scene 20 is shown. As shown in this example, in a BSP tree, each of the three splitting planes 21, 22, and 23 may be arbitrarily located in space with respect to the x, y, and z axes. Although it is less likely that an object may straddle a splitting plane in a BSP tree in comparison to a kd-tree, the BSP tree has greater storage requirements per node.

Figure 3:
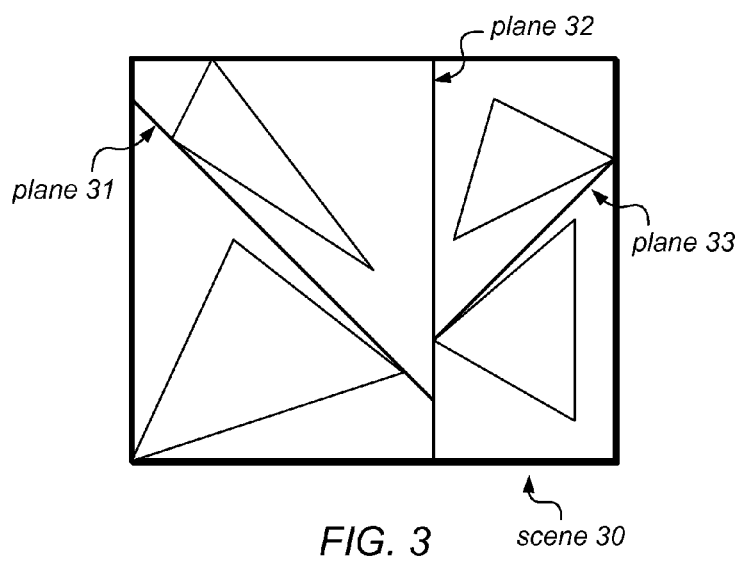
FIG. 3 illustrates an example of a scene partitioned using a kp-tree, which may be constructed according to various embodiments.

FIG. 3 illustrates an example of a similar scene 30 partitioned using a k-planes tree, or kp-tree, according to one embodiment. The scene 30 may be located in three-dimensional space including a z axis. For purposes of illustration, however, a two-dimensional section of the scene 30 is shown. Each of the three splitting planes 31, 32, and 33 may be aligned along the x, y, or z axis (e.g., as in a kd-tree) or may comprise another discrete oriented plane. In the example scene 30, two splitting planes 31 and 33 are aligned at 45 degrees with respect to the x or y axis while another splitting plane 32 is axis-aligned. Note that in various embodiments, arbitrarily oriented planes may be permissible. In one embodiment, a kp-tree may comprise a spatial database that partitions objects in a scene (e.g., a 3D scene) into disjoint regions using a spatial partitioning scheme. A kp-tree may therefore comprise a modified kd-tree. In another embodiment, a kp-tree may comprise a spatial database that partitions objects in a scene (e.g., a 3D scene) into sub-regions using a bounding volume scheme such that the sub-regions may or may not overlap in space. A kp-tree may therefore comprise a modified bounding volume hierarchy structure such as a modified SKD-tree or a modified BIH-tree.

Figures 4A, 4B:
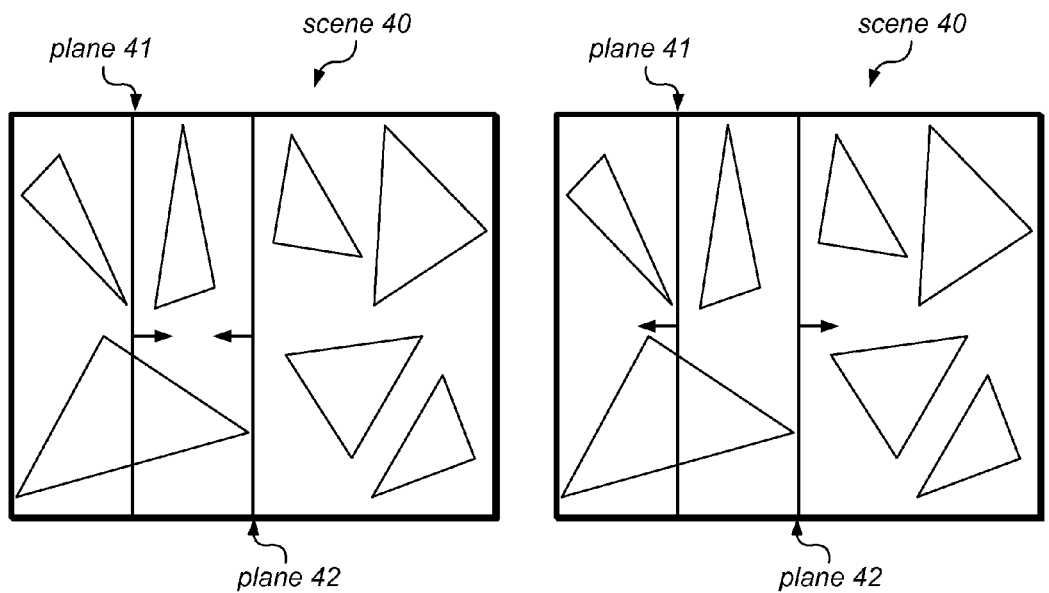
FIGS. 4A and 4B illustrate examples of a scene partitioned using bounding interval hierarchies, which may be constructed according to various embodiments.

FIGS. 4A and 4B illustrate the use of an unmodified BIH-tree to partition a scene 40. A BIH-tree may use multiple axis-aligned splitting planes to partition space. An advantage of choosing axis-aligned planes is that both traversal computation and tree node storage may be kept to a minimum. FIGS. 4A and 4B both illustrate the partitioning of scene 40 using two planes, designated as plane 41 and plane 42. The scene 40 may be located in three-dimensional space including a z axis. For purposes of illustration, however, a two-dimensional section of scene 40 is shown. Each of the splitting planes 41 and 42 are aligned along the y axis, in this example. As depicted by the arrows on each of the splitting planes, FIG. 4A illustrates scene 40 being partitioned into two overlapping spaces, while FIG. 4B illustrates scene 40 being partitioned into two disjoint spaces, separated by a gap. In a BIH-tree, a geometric primitive (e.g., a triangle) may be classified (i.e., placed in the appropriate space partition) based on the location of its centroid.

Data structures corresponding to each of the spatial partitioning and/or bounding volume methods described herein, or to other such methods, may in various embodiments comprise multiple types of nodes, such as root nodes (e.g., nodes representing an entire scene), group nodes (e.g., nodes representing collections of other nodes), and leaf nodes (e.g., representing geometric primitives of a scene).

Figure 5A:
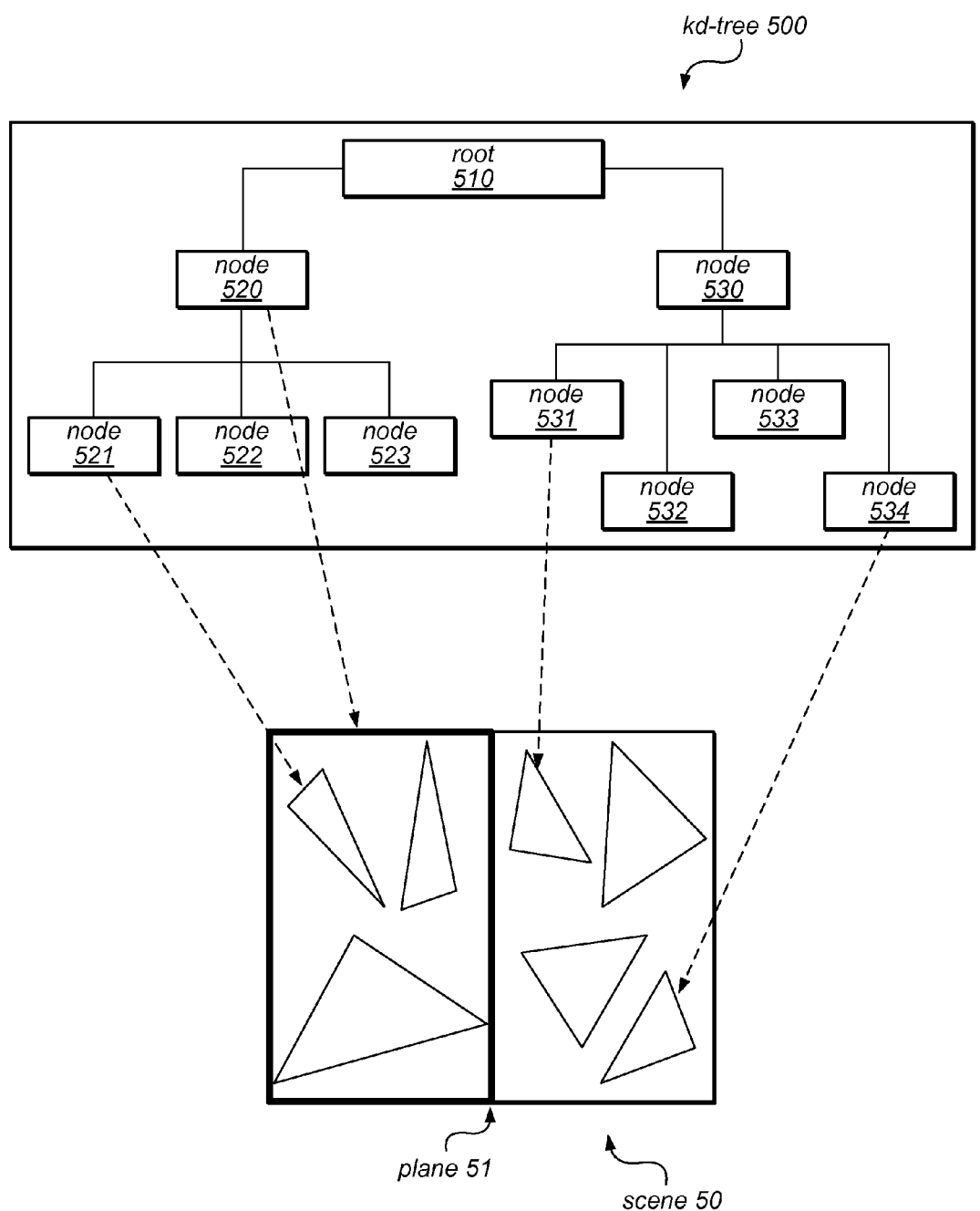
FIGS. 5A and 5B illustrate portions of structure of a kd-tree for a given scene, which may be constructed according to various embodiments.

FIG. 5A illustrates a portion of the structure of an example kd-tree 500 capturing the example scene 50, according to one embodiment. The scene 50 may be located in three-dimensional space including a z axis. For purposes of illustration, however, a two-dimensional section of scene 50 is shown. In this example, a root node 510 may conceptually represent the entire scene 50. Upon determining a first splitting plane (e.g., plane 51, aligned along the y axis), two child nodes 520 and 530 may be generated. In this example, nodes 520 and 530 are group nodes, and each represents a collection of other nodes in a hierarchy for scene 50. For example, group node 520 represents all of the geometric primitives in the left half of scene 50, as split by plane 51, shown outlined in bold in FIG. 5. Similarly, group node 530 represents all of the geometric primitives in the right half of scene 50. The objects represented by group node 520 include three child nodes 521, 522, and 523, each of which is a leaf node representing a single geometric primitive in the left half of scene 50. Similarly, the objects represented by group node 530 include four child nodes 531, 532, 533, and 534, each of which is a leaf node representing a single geometric primitive in the right half of scene 50. The objects represented in node 530 may be further subdivided by the selection of a second splitting plane 52, as illustrated in FIG. 5B.

Figure 5B:
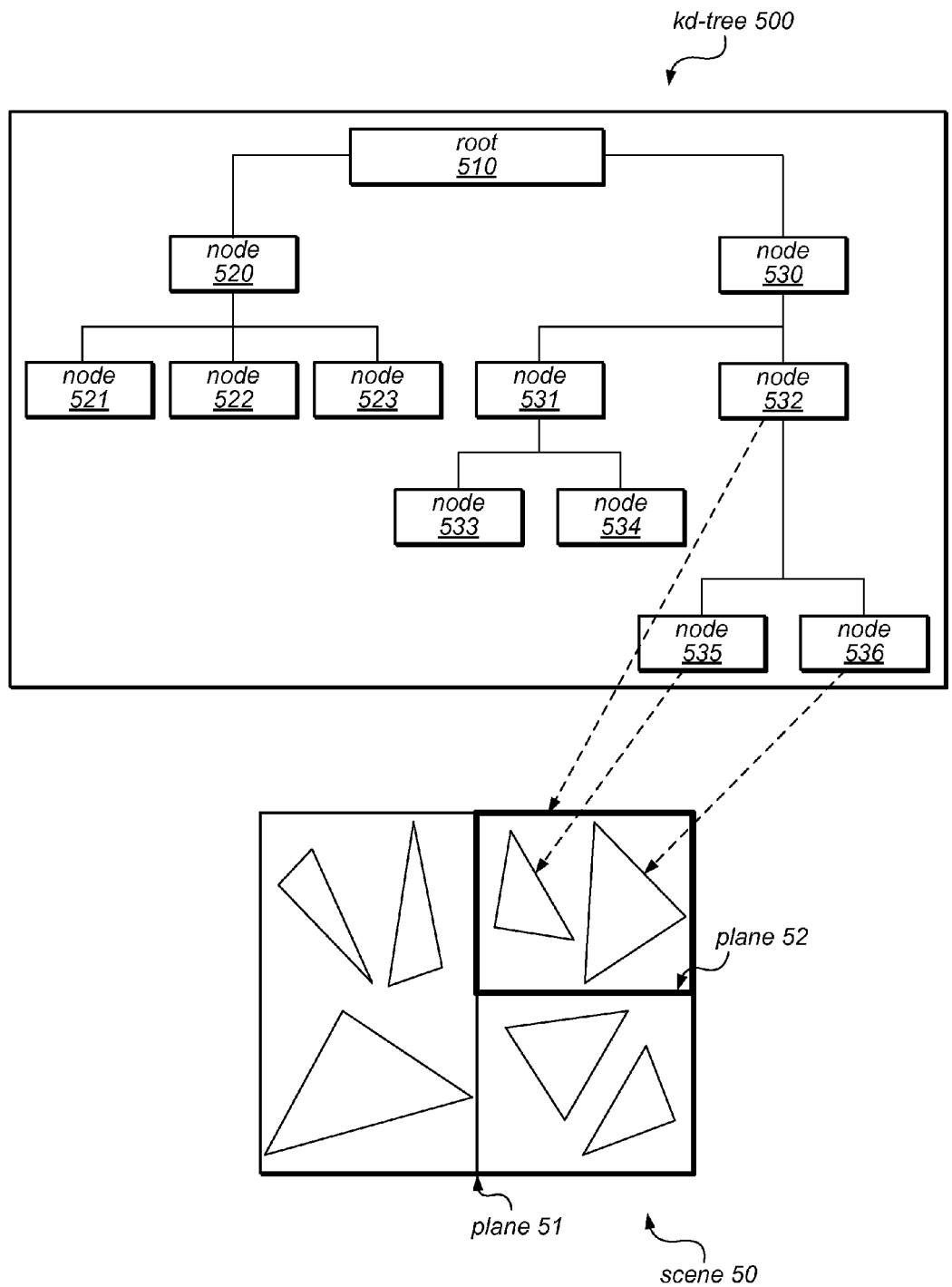

FIG. 5B illustrates a portion of the structure of the example kd-tree 500 capturing the example scene 50 following the additional splitting of the scene by plane 52, which is aligned along the x axis. In this example, node 530 has been subdivided by the selection of splitting plane 52, to generate two child nodes 531 and 532, each of which is also a group node. For example, while node 530 represents all of the geometric primitives on the right side of scene 50, node 531 represents those geometric primitives in the top right quadrant of scene 50, as outlined in bold, and node 532 represents those geometric primitive in the bottom right quadrant of scene 50. Thus, node 531 represents the collection of leaf nodes 533 and 534 (each of which represents a single geometric primitive in scene 50), and node 532 represents the collection of leaf nodes 535 and 536 (each of which represents a single geometric primitive in scene 50).

Each group node (which may also be referred to as an internal node) of a kd-tree may comprise a splitting plane location s, a splitting axis a (e.g., 0, 1, or 2 representing x, y, or z), a flag denoting that the node is internal to the kd-tree (i.e., not a leaf), and a pointer to the its children (which may be allocated consecutively in memory). The splitting plane may be stored as a 32-bit value. The split axis and flags may use two bits, and the offset may use thirty bits. Thus, all the items represented within the internal node may be packed into 64 bits. In one embodiment, nodes in a kd-tree may be aligned on four byte boundaries. The offset to the children may comprise a pointer, and the flags may be stored in the lower bits of the pointer (which would otherwise be zero due to alignment). Although a BSP tree permits tighter boundaries and more efficient pruning, the BSP tree has much larger storage requirements per node than a kd-tree: e.g., a normal and offset or four coordinates and a pointer to define a plane in three dimensions. Other types of data structures representing spatial partitioning and/or boundary volume hierarchies may include similar elements and/or other elements, in different embodiments. For example, each internal (i.e., non-leaf) node in a kp-tree may store data similar to the contents of the kd-tree node described above (e.g., a splitting plane location s, a splitting axis a, a flag denoting that the node is internal to the kp-tree, and an offset to its two children, while a leaf node may omit the flag and the offset to the children. However, in comparing the kp-tree to the kd-tree, more bits (e.g., 4) may be dedicated to describing the axis of the splitting plane in the kp-tree.

As previously noted, ray tracing may achieve higher efficiency during rendering when employing high quality data structures, such as those described above. In rendering a scene using ray tracing, any of the data structures described herein (or other high quality data structures) may facilitate the answer to a ray tracing query: given a ray in space, what is the first object that the ray intersects? These data structures may be traversed until such an object is found. Traversal may comprise recursively testing nodes to prune away large sections of the geometry of the scene. The particular traversal algorithms and/or computations used to answer this question may vary dependent on the particular data structure employed by the ray tracing operation. In a dynamic scene (e.g., in interactive graphics applications), these data structures must be updated or rebuilt each frame. Research to date shows an advantage to rebuilding the data structures from scratch, as incremental updates are difficult and the resulting structures are inferior to those of a complete rebuild.

Figure 6A:
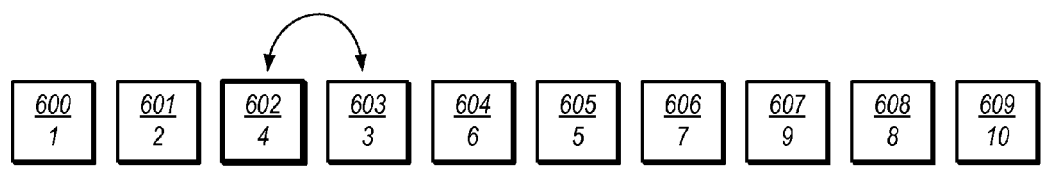
FIGS. 6A and 6B illustrate an array of elements sorted by a quicksort algorithm, according to various embodiments.

Building (and rebuilding) high quality data structures suitable for use in ray tracing, such as those described herein, may in general involve sorting a list of geometric primitives as the data structures are constructed. The system and methods described herein may accelerate the building of data structures for ray tracing, by taking advantage of a data structure representing a coarse hierarchy for a scene geometry. To better understand these methods, it may be useful to first understand the standard "quicksort" algorithm and how it may be improved under similar circumstances. FIG. 6A illustrates an array of 10 numbers (stored at 600-609), each having a value in the range 1-10 to be sorted into numerical order. Quicksort may be used to sort the sequence of numbers by the following method:

StandardQuicksort
1. Choose a pivot element. The pivot element may be chosen randomly or pseudo-randomly, in different embodiments. In this example, 4 (stored at element 602 in the list) is chosen as the pivot element.
2. Swap elements in the array until all elements less than the pivot precede the pivot in the array, and all elements greater than the pivot follow the pivot in the array.
3. Recursively apply this algorithm to the array range of elements that come before the pivot.
4. Recursively apply this algorithm to the array range of elements that come after the pivot.

Figure 6B:
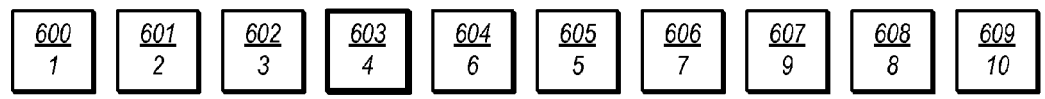

In this example, at step two, the algorithm visits each element in the array to see if it should be swapped. Since the value at 603 is less than the pivot element (at 602), the elements stored in 602 and 603 are swapped. After step 2, the pivot element is in its correctly sorted position, as shown in FIG. 6B. At step 3, the algorithm would be applied to elements 601-602 of FIG. 6B. In this example, one or more pivots may be chosen, but no additional swapping would be necessary, since these elements are in the correct order. At step 4, the algorithm would be applied recursively (one or more times) until elements 604-609 of FIG. 6B are in the correct order. Assuming a good pivot, the performance of the quicksort method is $O(n \lg n)$. Worst case pivot choices may result in performance of $O(n^2)$. In practice, however, the average running time may be $O(n \lg n)$.

Figure 7A:
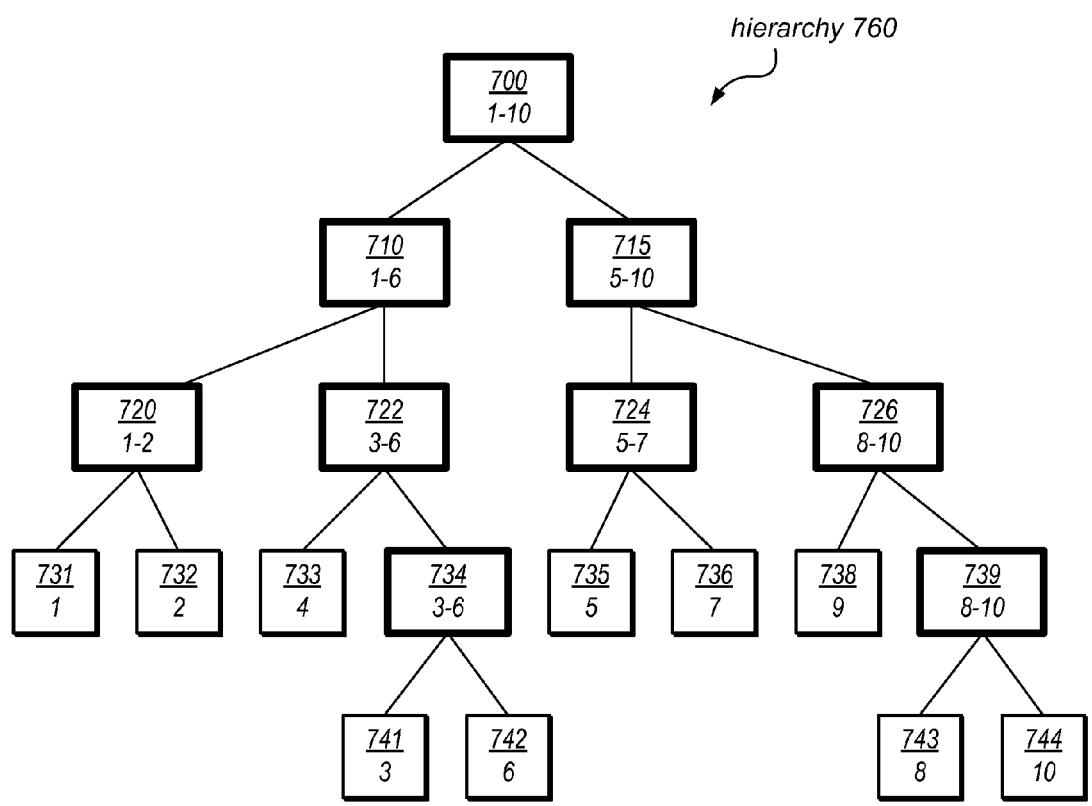
FIGS. 7A-7D illustrate the use of a hierarchical quicksort, according to various embodiments.
Figure 7B:
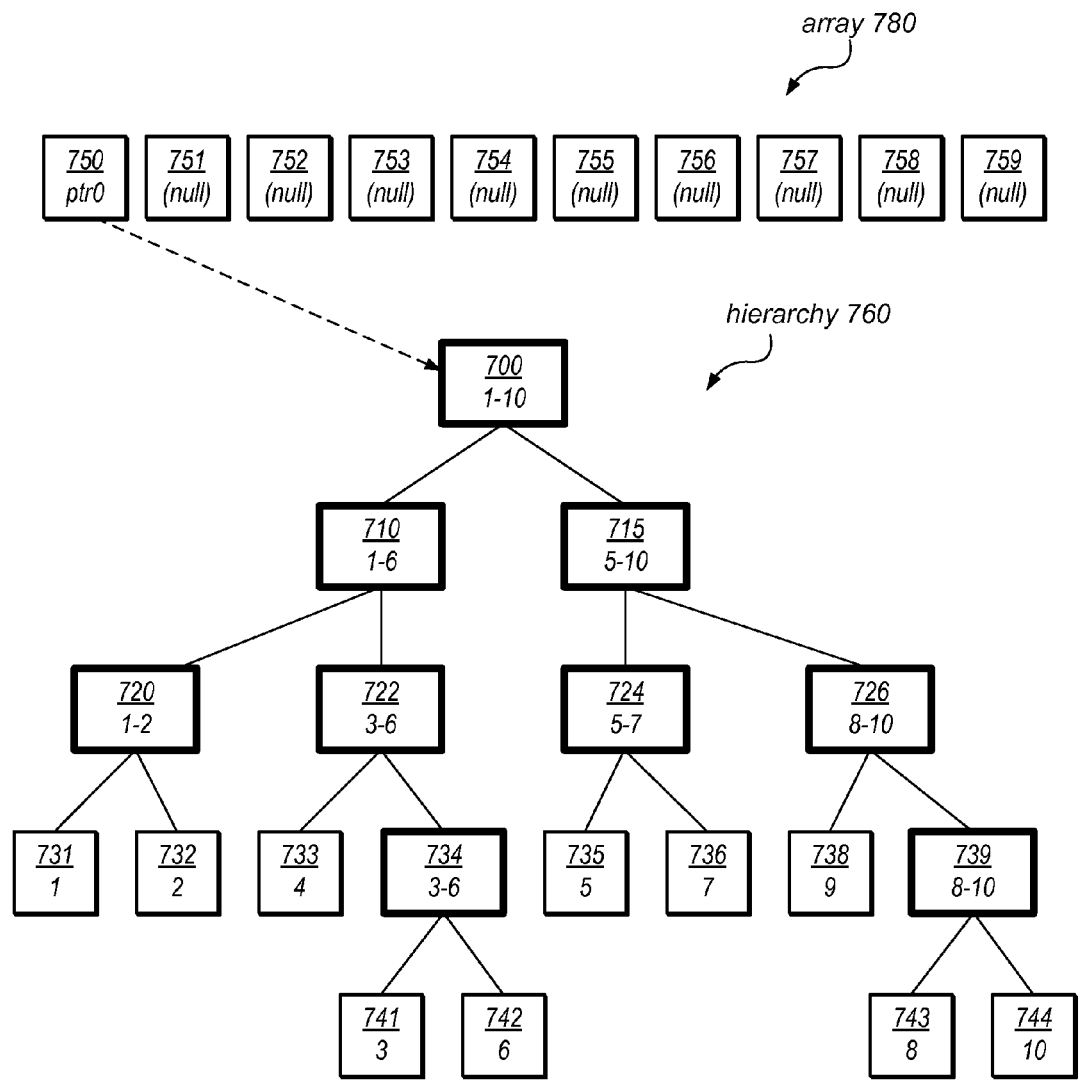
Figure 7C:
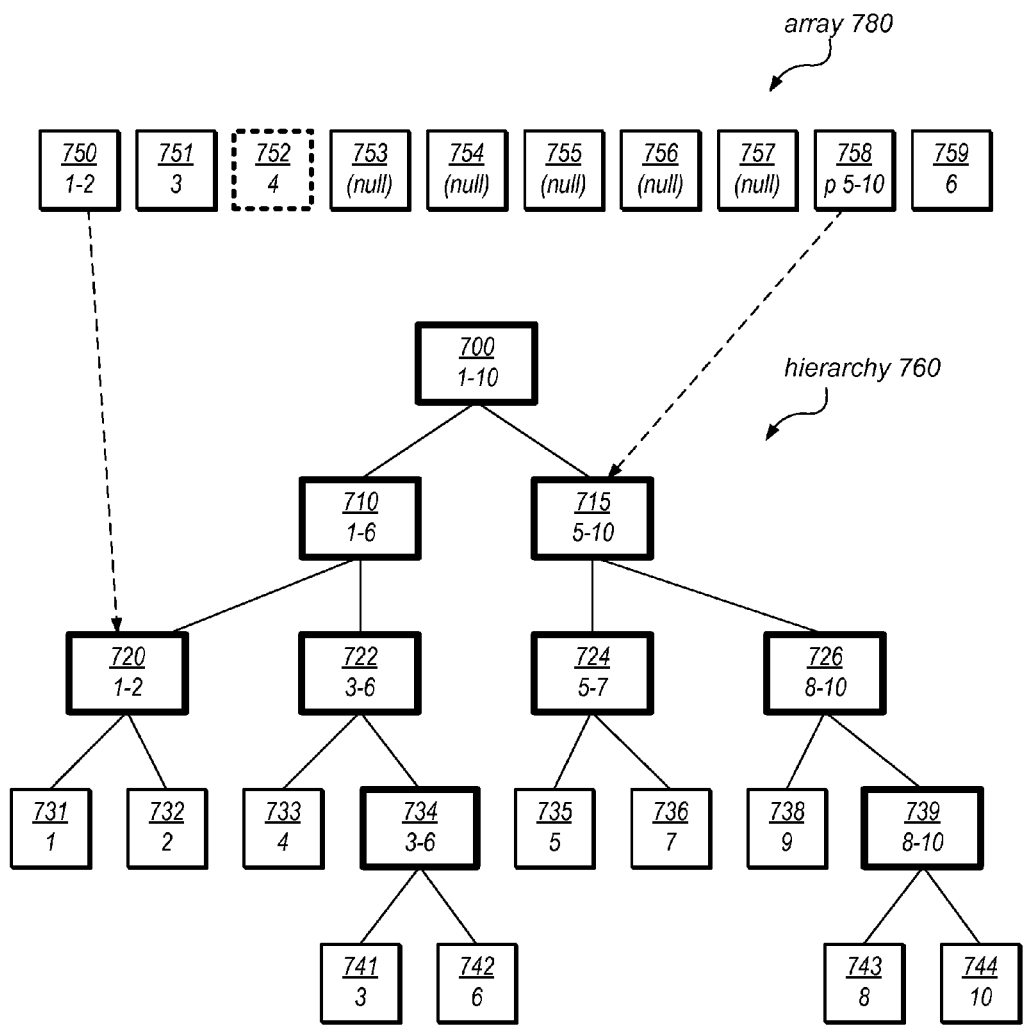

As described above, the quicksort algorithm may be expensive, even under reasonable pivot choices, due to the bandwidth required during execution. For example, in step 2 (at the start), every element in the array is visited, resulting in a scan of the entire array. Each time an element is visited, only a single comparison operation and potentially swap is performed. However, swapping clusters of elements across the pivot, rather than individual elements, may reduce this bandwidth, as described below. For example, assume the array of elements may be represented by the coarse hierarchy 760 illustrated in FIG. 7A. In this example, node 700 is a root node representing all of the elements of the array, and all of the elements are bounded by the range 1-10. Two child nodes of node 700 (nodes 710 and 715) are group nodes, also referred to as hierarchy nodes, or h-nodes. Each h-node represents a collection of other nodes, which may be h-nodes (further collections of nodes) and/or leaf nodes. In FIGS. 7A-7C, h-nodes are indicated with bold borders. Node 710 comprises a collection of nodes that (at its lowest levels) includes leaf nodes having values in the range 1-6. Note that the collection of leaf nodes represented by node 710 may or may not include all of the numbers in the range 1-6. Similarly, node 715 is an h-node representing a collection of nodes whose leaf nodes have values in the range 5-10.

At the next level of the hierarchy, two children of node 710 (nodes 720 and 722) are h-nodes representing collections of nodes whose leaf nodes have values in the ranges 1-2 and 3-6, respectively. Two children of node 715 (nodes 724 and 726) are also h-nodes. They represent collections of nodes whose leaf nodes have values in the range 5-7 and 8-10, respectively. The children of node 720 (nodes 731 and 732) are leaf nodes having values of 1 and 2, respectively, and the children of node 724 (nodes 735 and 738) are also leaf nodes having values of 5 and 7, respectively. Node 722 has two children, one of which (node 733) is a leaf node having a value of 4, and the other of which is an h-node representing leaf nodes 741 and 742, having values of 3 and 6, respectively. Similarly, node 726 has two children, one of which (node 738) is a leaf node having a value of 9, and the other of which is an h-node representing leaf nodes 743 and 744, having values of 8 and 10, respectively. In this example, each h-node stores the value range for the collection of nodes that it represents, and each leaf node stores one of the values 1-10.

The coarse hierarchy shown in FIG. 7A may be used to accelerate a quicksort operation (executing a "hierarchical quicksort" algorithm) on the array of numbers in the following manner. An empty list of pointers whose size is equal to the number of elements (shown as array 780 in FIG. 7B) is initialized. As shown in FIG. 7B, after initialization, the first element of the list points to the top of the node hierarchy (node 700) and the remaining element slots are unused. An arbitrary pivot is chosen, as before. In this example, 4 is again chosen as the pivot (as indicated by the dashed line around element 752).

The hierarchical quicksort algorithm visits each array slot. If the slot points to an h-node then the range specified by that h-node is examined. If the pivot is less than the h-node range, the h-node is swapped to the far right of the array. If the pivot is greater than the h-node range, the array counter is incremented. If the h-node range includes the pivot, the algorithm visits the h-node's children and applies the same process. For example, at initialization the first element of the array points to root node 700 (which is also an h-node). The range specified by this h-node (1-10) includes the pivot (4), so the algorithm visits its children (nodes 710 and 715). The range specified by node 715 is greater than the pivot, so the pointer is swapped to the far right side of the array, so that element 759 points to node 715. The range specified by node 710 (1-6) includes the pivot, so the algorithm visits its children (nodes 720 and 722). The range specified by node 720 (1-2) is less than the pivot, so the array counter is incremented, leaving the first element pointing to node 720. The range specified by node 722 (3-6) includes the pivot, so the algorithm visits its children (nodes 733 and 734). The range specified by 734 (3-6) includes the pivot, so the algorithm visits its children (nodes 741 and 742). Node 741 is a leaf node with a value less than the pivot, so the array counter is incremented, leaving the second array element pointing to node 741, with its value of 3. Node 742 is a leaf node with a value greater than the pivot, so the pointer is swapped to the far right of the array. In other words, the pointer at 759 points to leaf node 742, with a value of 6, swapping the pointer at 758, so that it points to node 715. Node 733 is a leaf node that includes the pivot (4), so the pointer is incremented, leaving the pointer at 752 pointing to the node 733. FIG. 7C illustrates the resulting array after applying the top-level scan of the hierarchical quicksort algorithm, and indicates two of its pointers and their target nodes using dotted lines from elements 750 and 758 of array 780 to nodes 715 and 720 of hierarchy 760.

Note that in this example, the elements greater than the pivot are packed tightly on the right of array 780 following the top-level scan of hierarchy 760. The elements less than or equal to the pivot are on the left of array 780. The NULL elements (unused pointer elements) in the middle of array 780 are a result of having sub-trees in the hierarchy that have yet to be expanded.

Note that in some embodiments, every h-node may include the count of the number of leaf nodes below it. This may allow the algorithm to place the pivot in its correct position following the initial hierarchy scan. In the example illustrated in FIGS. 7A-7D, there are three values less than the pivot and six values greater than the pivot.

Figure 7D:
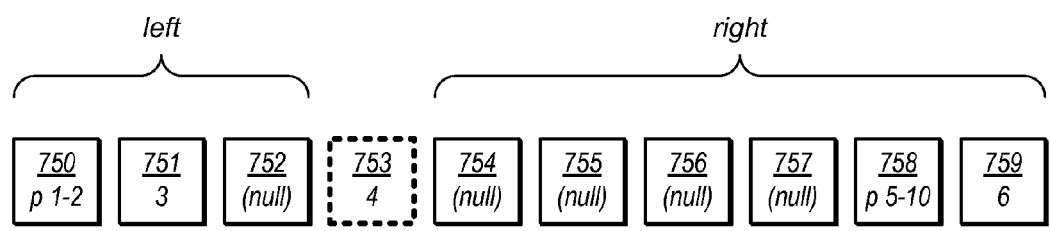

Using this information, the algorithm may place the pivot in its correct position in array 780, as shown in FIG. 7D. As in the standard quicksort algorithm, the algorithm may then be applied recursively to the nodes on the left side of the pivot and to those on the right side of the pivot, as indicated in FIG. 7D. As noted above, the nodes on the right side of the pivot are packed tightly to the right, in this example. To more efficiently handle recursively sorting the right side, the same algorithm described above may be applied in reverse. Example pseudo code for each of the recursions is given below:

HQSortL (Array A) //Algorithm Applied Recursively on the Left Side
1. If the length of A is one, return
2. Choose pivot
3. Starting at the beginning of the array, swap elements great than the pivot to the end of the array
4. Put the pivot in its correct place
5. Call HQSortL(A[0, pivot−1])
6. Call HQsortR(A[pivot+1, AEnd])

HQSortR (Array A) //Algorithm Applied Recursively on the Right Side
1. If the length of A is one, return
2. Choose pivot
3. Starting at the end of the array, swap elements less than the pivot to the beginning of the array
4. Put the pivot in its correct place
5. Call HQSortL (A[0, pivot−1])
6. Call HqsortR (A[pivot+1,AEnd])

In some embodiments, ray tracing data structures may be efficiently built (or rebuilt) by applying a hierarchical sort, as described above, to elements of a coarse hierarchy of scene elements. For example, rather than sorting numbers (or pointers thereto), the hierarchical quicksort algorithm described above may be used to sort geometrics primitives (e.g., triangles) or pointers thereto, if a "pretty good" bounding volume hierarchy (specifying spatial coordinates of a bounding range for objects in a scene) exists for the scene geometry. In many cases, such a data structure may already exist. In fact, many graphics applications provide such a coarse hierarchy. In particular, most 3D applications encode scene geometry into a tree like structure known as a scene graph. This structure groups geometry by objects and provides a coarse hierarchy over the scene. When data is loaded into a graphics application, the scene graph may be loaded with it. In addition, most graphics applications update the scene graph as the scene changes (e.g., as objects are animated, edited, or moved, the scene graph tracks the changes).

A scene graph may in some embodiments be adapted for ray tracing by placing bounding volumes at every node of the graph. The result would be an HBV (hierarchical bounding volume tree). Unfortunately, the quality of this tree may not be ideal for ray-tracing, since primitives may not be spatially clustered very well and/or the tree may only include entire objects and thus not be fine enough in granularity for efficient ray tracing performance. In addition, objects in the scene graph may overlap other objects in space completely (e.g., a "wheel" object may completely overlap its subcomponent "tire" in space). The scene graph, however, may provide an initial data structure that can be used to accelerate the construction of a higher quality data structure (e.g., a finer-grained HBV-tree, kd-tree, BIH/SKD-tree, kp-tree, etc.). In other words, in some embodiments, a scene graph may play the role of the coarse hierarchy described above in the hierarchical quicksort algorithm.

A scene graph typically arranges the logical representation of the elements of a scene in a graph or tree structure. For example, a root node of a scene graph may represent the whole scene. The tree may include a plurality of group nodes, each representing an object in the scene (e.g., a person, a car, a house, a tree). In one example, a parent node may represent a car, and this node may have child nodes representing major components of the car (e.g., hood, roof, left door, right door, left wheel, right wheel, windshield, trunk). The scene graph may include information about properties associated with individual components (as specified by a child node) or with an object (as specified by a parent node). The scene graph may also include information about transformations that are allowed at the group node level (e.g., to move or rotate the whole car) or at a leaf node level (e.g., to turn the left wheel independently from the rest of the car). In some embodiments, the scene graph may represent a shallow hierarchy, with only 1-3 levels below the root node. Therefore, as discussed above, the leaf nodes of a scene graph are typically not of fine enough granularity to make this data structure well suited to be used directly in ray tracing (where leaf nodes are typically single geometric primitives).

Figure 8:
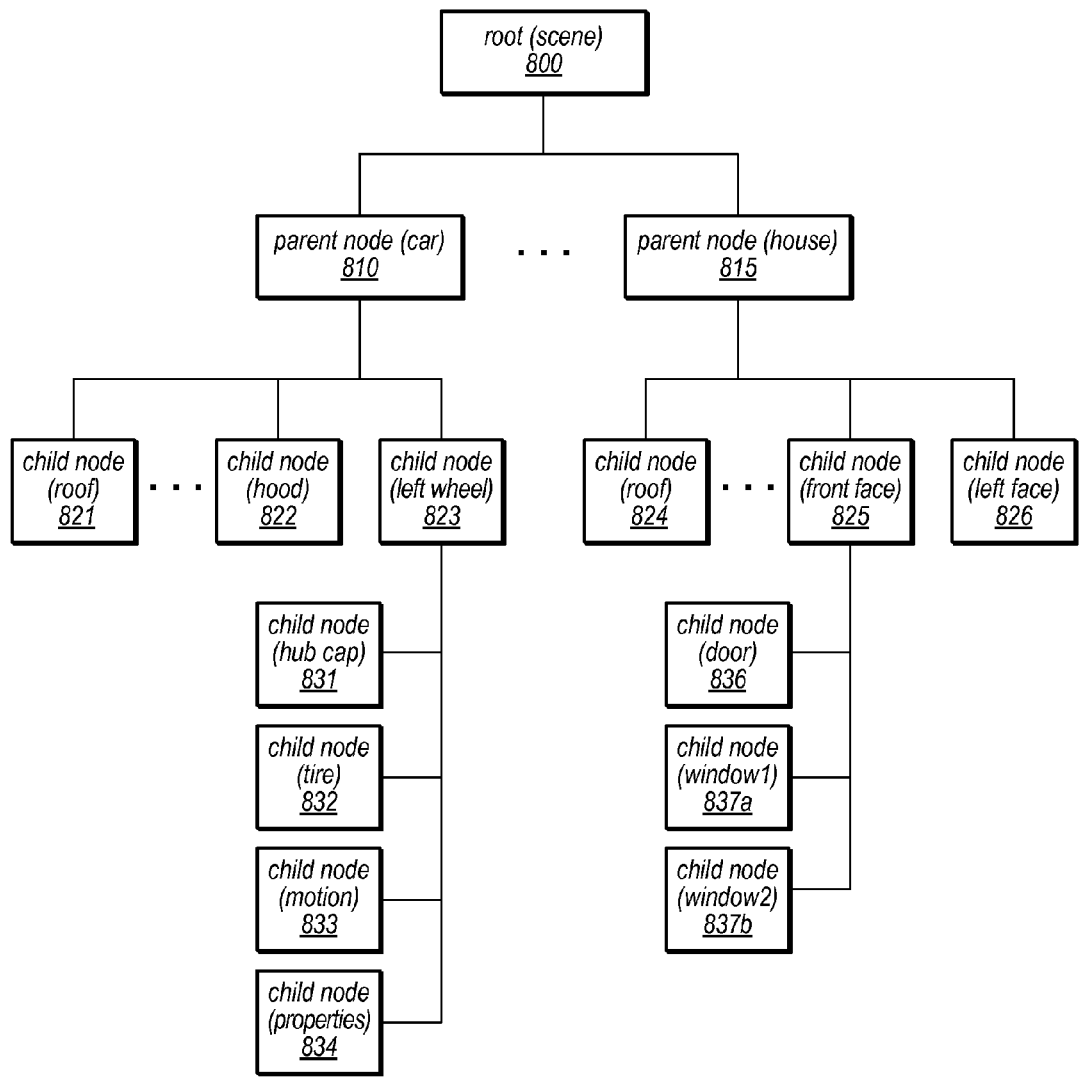
FIG. 8 illustrates an example of a scene graph, according to one embodiment.

FIG. 8 illustrates an example of a portion of a scene graph, according to one embodiment. In this example, a root node 800 represents a scene. Two of its children are parent node 810 (representing a car) and parent node 815 (representing a house). In this example, three children of parent node 810 are illustrated, although others may exist (not shown). The children of parent node 810 include node 821 (roof), node 822 (hood), and node 823 (the left wheel). In some embodiments, any of these nodes may also have child nodes, especially if there are sub-components of an object represented by one of the child nodes that would be rendered separately from the rest of the parent object or on which transformations may be independently applied. In general, a scene graph may typically include only a few levels of hierarchy below the root node. In the example illustrated in FIG. 8, a third level of hierarchy is illustrated below node 823 (the left wheel). The children of this node include 831 (a hubcap), 832 (a tire), 833 (which specifies motions allowed by the left wheel), and 834 (which may specify other properties of the left wheel). In the example illustrated in FIG. 8, the children of node 815 (house) include node 824 (the roof), node 825 (the front face of the house), and node 826 (the left side of the house). Node 825 (front face) also has several child nodes, including node 836 (door), and two nodes 837 (windows). Since the example scene graph depicted in FIG. 8 does not include any additional level of hierarchy, each of the elements represented in the scene graph may include a large number of geometric primitives. For example, the tire represented by node 832 may be made up of 1000 triangles or more, in some applications. Therefore, it may not be efficient to use this scene graph directly for efficient ray tracing. In addition, the left wheel (node 823) may completely overlap the hubcap (831) and tire (832) in space, causing all of the children of these nodes to be traversed in a ray tracing operation. As noted above, in some embodiments, a scene graph may include, or may be adapted to include, a bounding volume hierarchy. This is described in more detail below.

As illustrated using the hierarchical quicksort algorithm above, bandwidth for building ray tracing data structures may in some embodiments be reduced by assuming that scene data is in an existing hierarchy. Even if this hierarchy is coarse, it may provide a benefit, since it may allow large clusters of geometric primitives (e.g., triangles making up an object and/or one of its subcomponents) to be swapped across a partition. In the context of 3D rendering and ray tracing, a hierarchical sorting algorithm, as described herein, may be used to build tree data structures in which geometric primitives sit in the leaves of the tree. The most popular primitive in 3D graphics application may be the triangle, but other geometric primitives, including spheres, cylinders, or non-uniform rational B-spline (NURBS) patches may also serve as leaf elements in a ray tracing data structure, in various embodiments.

Figure 9:
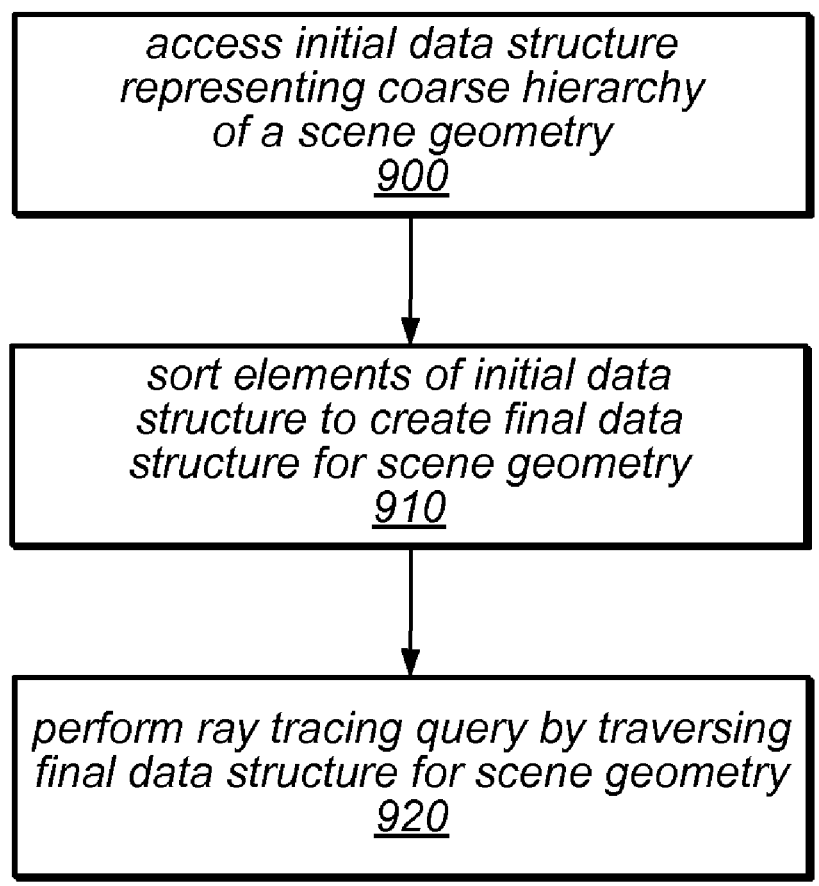
FIG. 9 is a flow diagram illustrating a method for building and using a high quality data structure for ray tracing, according to various embodiments.

One method for building and using ray tracing data structures is illustrated in FIG. 9. In this example, an initial data structure representing a coarse hierarchy of a scene geometry is accessed, as in 900. As discussed above, this initial data structure may in some embodiments be a coarse scene graph HBV tree (hierarchical bounding volume tree). In such embodiments, every node of the tree may store a bounding volume (e.g., spatial coordinates of a bounding volume) that encloses all of its children. The count of the number of primitives below the node may also be stored with every h-node of the scene graph (e.g., it may be added to the scene graph as it is built by the graphics application with which the scene was created). As described above with respect to the hierarchical quicksort algorithm, in some embodiments, storing the count of the number of primitives in each h-node may allow the position of the pivot (e.g., the splitting plane) to be correctly located in the pointer array. In various embodiments, the bounding volume primitives of the scene graph may be bounding spheres, bounding cylinders, convex hulls, AABBs (axis-aligned bounding boxes), OBBs (oriented bounding boxes), k-DOPS (k-discrete oriented plane bounding regions), etc.

Building the high quality trees from the initial data structures may then follows the same approach detailed by the hierarchical quicksort algorithm above. In other words, elements of the initial data structure may be sorted to create the final data structure, as in 910, in some embodiments. As in the hierarchical quicksort algorithm described above, swapping of whole sub-trees (e.g., those representing objects or collections of objects) may be performed across the partitioning split, without needing to visit each geometric primitive in the scene. In some embodiments, sub-trees may be split only when the split line divides them. For example, when building a kd-tree with axis aligned splitting planes, if the h-nodes contain AABBs, the algorithm may include determining whether the plane intersects the bounding box (AABB). If it does, then the h-node may need to be split by looking into its children. A ray tracing query may be performed by traversing the final data structure for the scene geometry, as shown in 920. For example, a method for performing a ray tracing query may begin by visiting the top of the final data structure and determining if the ray hits the right side, the left side, or both. The method may eliminate all of the primitives on a side that is not hit, and may be applied recursively for a split on each level of the hierarchy until it reaches the first geometry that will be hit by the ray.

Figure 10:
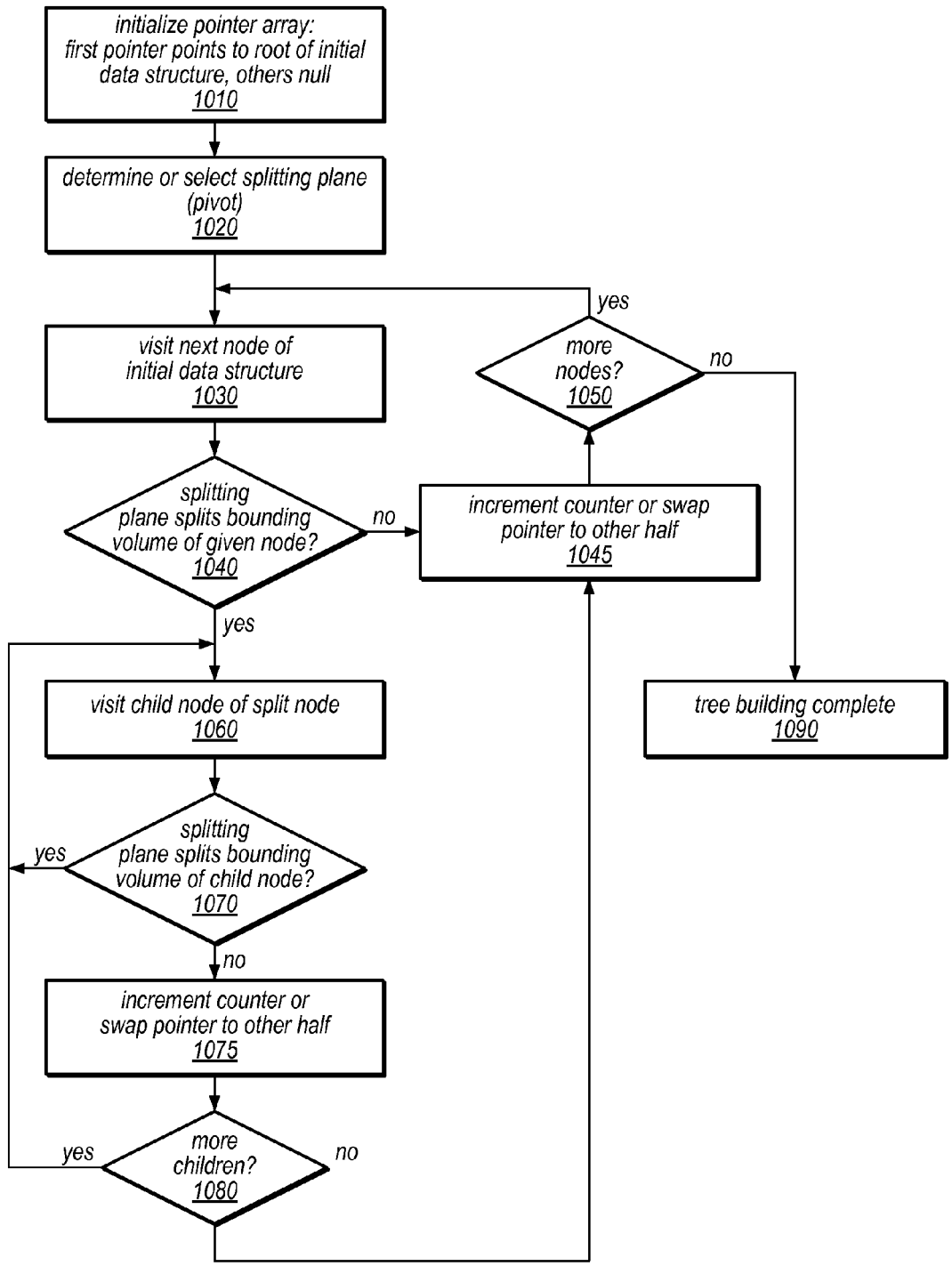
FIG. 10 is a flow diagram illustrating a method for constructing a ray tracing data structure from an initial coarse hierarchy, according to various embodiments.

In some embodiments, tree building for ray tracing may involve sorting pointers to elements with respect to a splitting plane, rather than sorting the elements themselves. Thus the tree building method may include partitioning a list of pointers to elements. As described above with regard to the hierarchical quicksort algorithm, some of the elements in the list may point to h-nodes and not elements. One method for building ray tracing data structures using pointers is illustrated in FIG. 10. In this example, a pointer array may be initialized such that the first array element points to the root of the initial data structure (e.g., a scene graph), and the other array elements contain null values, as in 1010. A splitting plane (which may serve as a pivot) may be selected or otherwise determined, as in 1020.

In this example, the next node of the initial data structure (e.g., the first node below the root node) may be visited, as in 1030, and the method may include determining if the splitting plane splits the bounding volume of the first node, as in 1040. If so, shown as the positive exit from 1040, the method may include visiting a first child node of the split node, as in 1060. Similarly, if the splitting plane splits the bounding volume of the child node, shown as the positive exit from 1070, the method may include recursively visiting one or more child nodes of the first child node, shown as the feedback loop from 1070 to 1060. If the first child node is not split by the splitting plane, the shown as the negative exit from 1070, the method may include incrementing the array counter (thereby leaving the current pointer pointing to the child node), or swapping the pointer to the other side of the splitting plane (pivot), depending on the side of splitting plane on which the bounding volume is located, as in 1075. If there are more children to be visited, shown as the positive exit from 1080, the method may include visiting those children and recursively applying the operations illustrated as 1060-1080, in this example.

If the first node visited is not split by the splitting plane, shown as the negative exit from 1040, the method may include incrementing the array counter (thereby leaving the current pointer pointing to the first node), or swapping the pointer to the other side of the splitting plane (pivot), depending on the side of splitting plane on which the bounding volume of the first node is located, as in 1045. If there are more nodes to be visited, shown as the positive exit from 1050, the method may include visiting those nodes and recursively applying the operations illustrated as 1030-1080, as applicable, in this example. Once there are no more nodes to be visited, shown as the negative exit from 1050, the tree building is complete, as in 1090.

In the method described above, different information may be stored at the nodes of the ray tracing data structure depending on whether the node points to an h-node or a primitive, and the method may treat the nodes differently depending on whether they are h-nodes or primitives. For example, when visiting a pointer to a node, rather than to a primitive, the method may include determining the bounding coordinates of the primitives below the node. When visiting a pointer to a primitive, the method may include determining the centroid of the primitive. Any of various methods may be used to distinguish h-nodes from primitives and/or to distinguish pointers to h-nodes from pointers to primitives, in different embodiments. In one embodiment, a flag may be stored with every pointer to denote whether it points to an h-node or primitive. In another embodiment, h-nodes may be allocated from a contiguous block of memory. This may allow a fast check to be performed on the address of the pointer to see if it points to an h-node or to a primitive. Conversely, in one embodiment, primitives may be stored in a contiguously allocated block. In yet another embodiment, a counter used to store the count of primitives below an h-node may be set to zero for a leaf node (primitive).

Some data structures such as kd-trees and octrees provide a disjoint partitioning of space (i.e., their children never overlap). In such cases, a primitive that overlaps the split may be pushed into multiple child nodes. In some embodiments, the split primitive may be duplicated on both the right and left half of the splitting plane, for example. For a kd-tree, these duplicate primitives must be placed on the left and the right. By allocating extra space in the pointer sorting array, primitive references may be duplicated. It may be difficult to estimate how much extra space will be needed for duplicate primitive references. However, in some embodiments, when a child node is created, unused space may be forwarded on to the remaining sub-trees that have not been built. In other embodiments, two different bounding volumes may be built, one for the portion of the primitive on the right half of the splitting plane, and one for the portion of the primitive on the left half of the splitting plane. In such embodiments, when a primitive is split (e.g., if a triangle is split by a plane), it may be important to compute tight bounding volumes for the object on the left and right half of the split. Such bounding volumes may accelerate partitioning in later steps when determining on which side of a partition a sub triangle piece falls. If such tight bounds are not computed for split primitives, then they may be misclassified, resulting in a less efficient data structure (e.g., the primitive may be unnecessarily inserted into a sub-tree).

In some embodiments, to handle such split primitives, a separate SplitPrimitive structure may be introduced that stores the following:
    Struct SplitPrimitive
    bounding volume
    *ptr to primitive When a primitive gets split during partitioning, two SplitPrimitive structures may be created for it. Pointers in the sorting array may be allowed to point to these SplitPrimitives. In such embodiments, any pointer in the sorting array may point to a primitive, a split primitive, or an h-node. Again, a split primitive space may be allocated in advance, and the methods may include testing pointer ranges to determine whether a pointer points to a split primitive.

Figure 11:
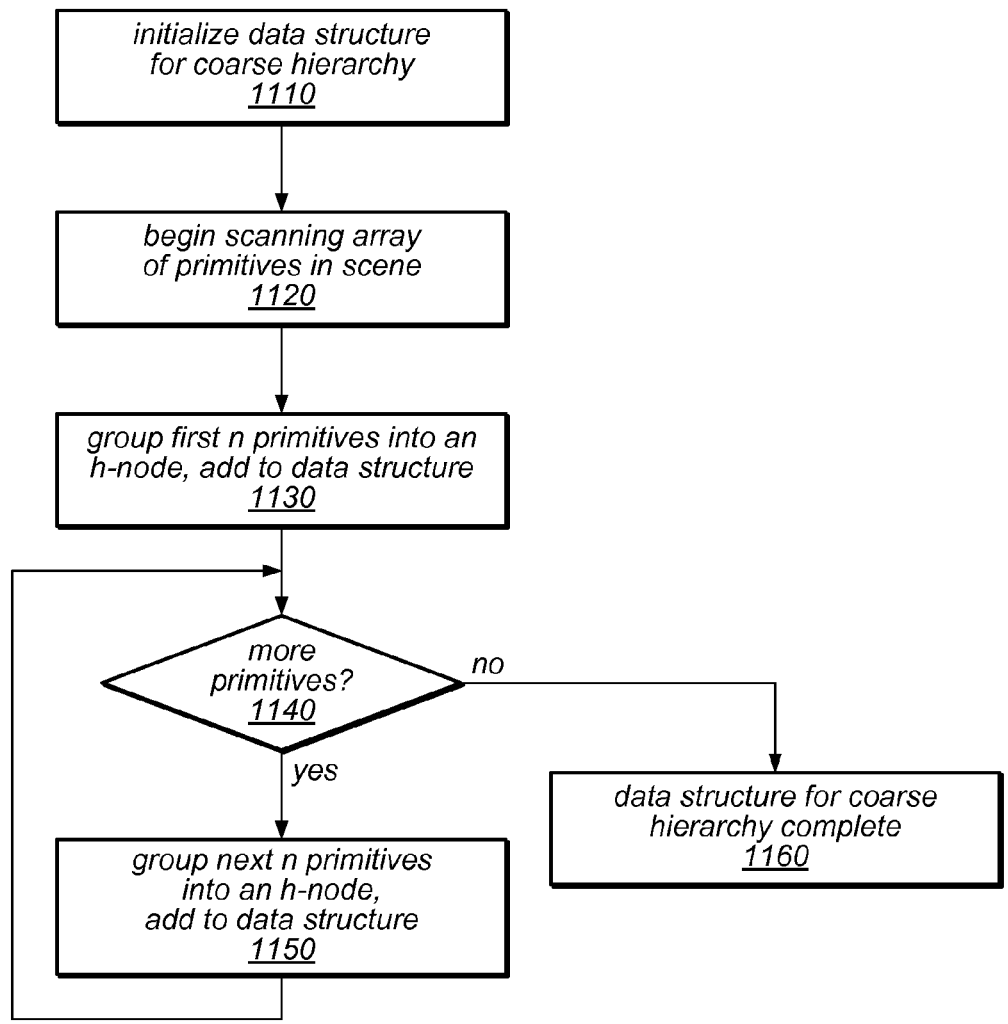
FIG. 11 is a flow diagram illustrating a method for constructing an initial data structure representing a coarse scene hierarchy, according to one embodiment.

The methods for accelerating the building of ray tracing data structures, as described herein, may take in some embodiments take advantage of existing coarse hierarchies, such as scene graphs. However, not all graphics applications include such scene graphs or other representations of hierarchy. Therefore, sometimes a mesh or object must be rendered that does not come with a suitable hierarchy. In such cases, a very coarse hierarchy may be built on the fly in a single pass (or two) through the data. Various methods may be used to build a coarse hierarchy, in different embodiments. One method is illustrated in FIG. 11. In this example, the method may include initializing a data structure for the coarse hierarchy, as in 1110. The method may include beginning a scan of an array of primitives in a scene (e.g., a flat list of geometric primitives included in the scene), as in 1120. The first n primitives encountered in the array may be arbitrarily grouped into an h-node, which may be added to the data structure, as in 1130.

For example, in one embodiment, an h-node may be created for every 128 geometric primitives, or for every 512 geometric primitives.

In the example illustrated in FIG. 11, as long as there are more primitives in the scene geometry, shown as the positive exit from 1140, the method may include grouping the next n primitives into an h-node and adding it to the data structure, as in 1150. This is shown as the feedback loop to 1140. When there are no more primitives in the scene geometry, shown as the negative exit from 1140, the data structure for the coarse hierarchy is complete, as in 1160. This method may in some embodiments work well for meshes, since many meshes store primitives with some degree of spatial locality. In CAD programs, by the nature of how objects are built up in memory, locality in memory is typically strongly correlated with locality in space. For example, if a car is drawn as subcomponents and then assembled in a CAD program, the data corresponding to each of the subcomponents may typically be stored together in memory by the CAD program, along with data specifying their relationship.

Figure 12:
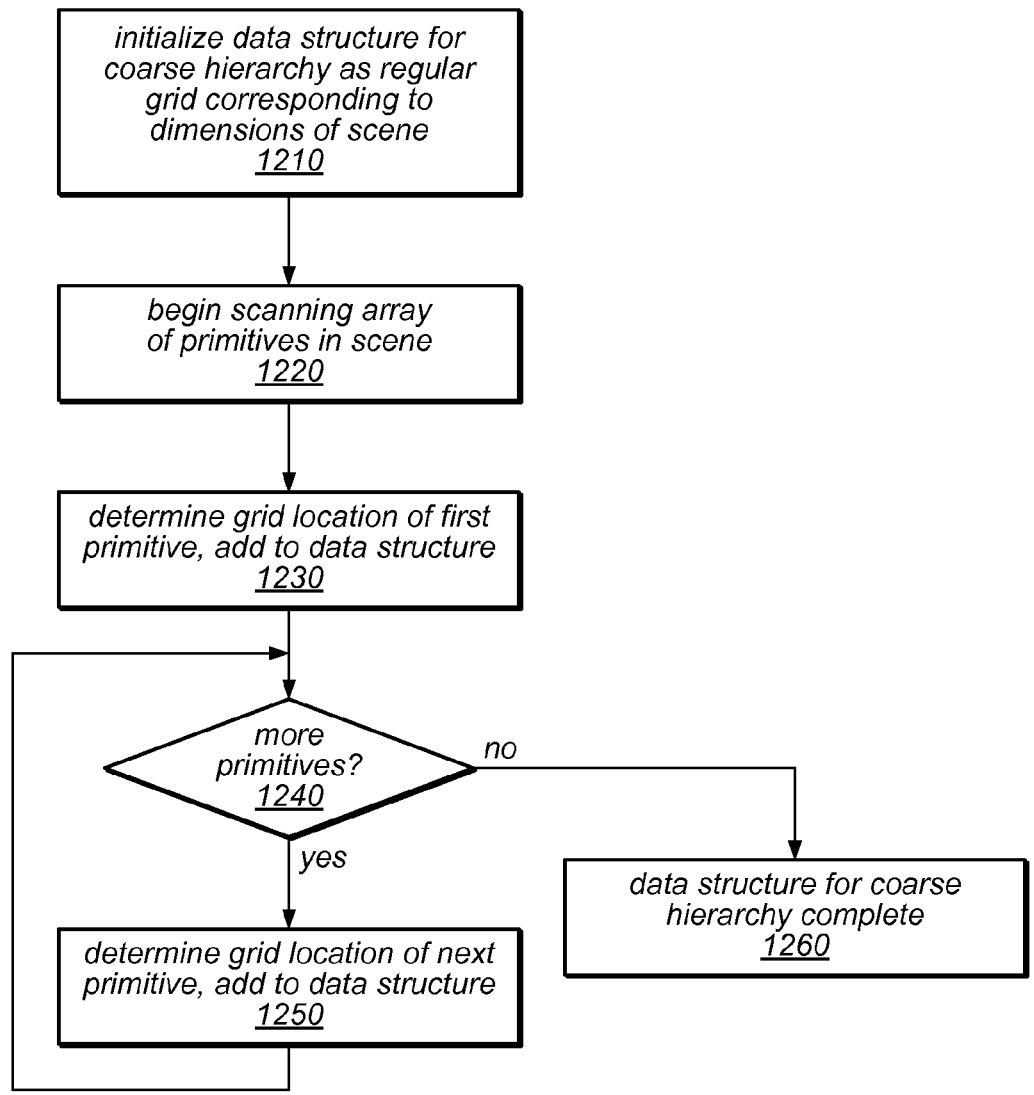
FIG. 12 is a flow diagram illustrating a method for constructing an initial data structure representing a coarse scene hierarchy, according to one embodiment.

Another method for building a coarse hierarchy when one does not exist is illustrated in FIG. 12. In this example, the method may also include initializing a data structure for the coarse hierarchy, as in 1210. However, the data structure may be a regular grid corresponding to dimensions of the scene. The method may include beginning a scan of an array of primitives in a scene (e.g., a flat list of geometric primitives included in the scene), as in 1220. For each primitive, the method may include determining the location of the primitive with respect to the grid, and adding the primitive to the corresponding grid element, as in 1230.

In the example illustrated in FIG. 12, as long as there are more primitives in the scene geometry, shown as the positive exit from 1240, the method may include determining the location of each primitive with respect to the grid and adding it to the data structure, as in 1250. This is shown as the feedback loop to 1240. When there are no more primitives in the scene geometry, shown as the negative exit from 1240, the data structure for the coarse hierarchy is complete, as in 1260. In some embodiments, the method illustrated in FIG. 12 may include a second pass (not shown) to scan through the data structure to count the number of primitives stored in each grid location (and, therefore, below each h-node) and to store the counts at each h-node. In other embodiments, a running count may be incremented for each grid location as primitives are added to the h-node. The method illustrated in FIG. 12 may result in a "better" hierarchy for a scene (since it is locality-based), but may take longer to build the data structure than the method illustrated in FIG. 11.

Using embodiments of the systems and methods described herein, ray tracing computations (e.g., ray tracing queries) used in the rendering of three-dimensional (3D) graphics may be accelerated through the use of a hierarchical build of a ray tracing data structure. Embodiments of the systems and methods described herein may be implemented using suitable computing hardware such as a central processing unit (CPU) and/or graphics processing unit (GPU). The performance of ray tracing computations and the building ray tracing data structures may be improved by using a CPU and/or GPU that includes facilities for parallel processing. In solving a ray tracing query, a ray tracing data structure, as described herein, may be traversed to identify a first object of the plurality of objects intersected by the ray. Additional ray tracing queries may be solved for additional rays to render the entire scene. In one embodiment, the scene may then be displayed on a display device using appropriate graphics hardware.

Figure 13:
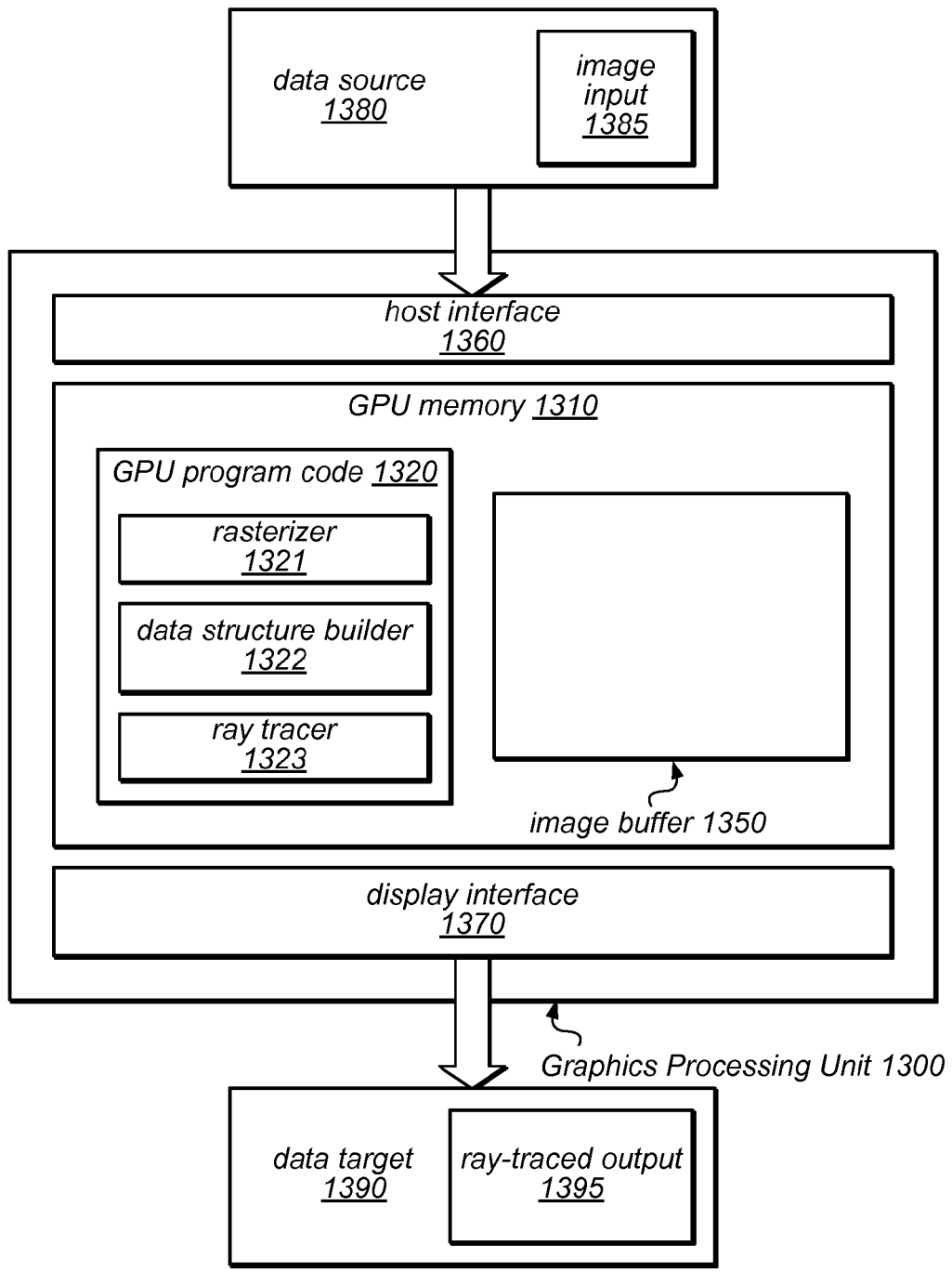
FIG. 13 is a block diagram illustrating one embodiment of a graphics processing unit (GPU) configured for ray tracing and/or construction of high quality ray tracing data structures.
Figure 14:
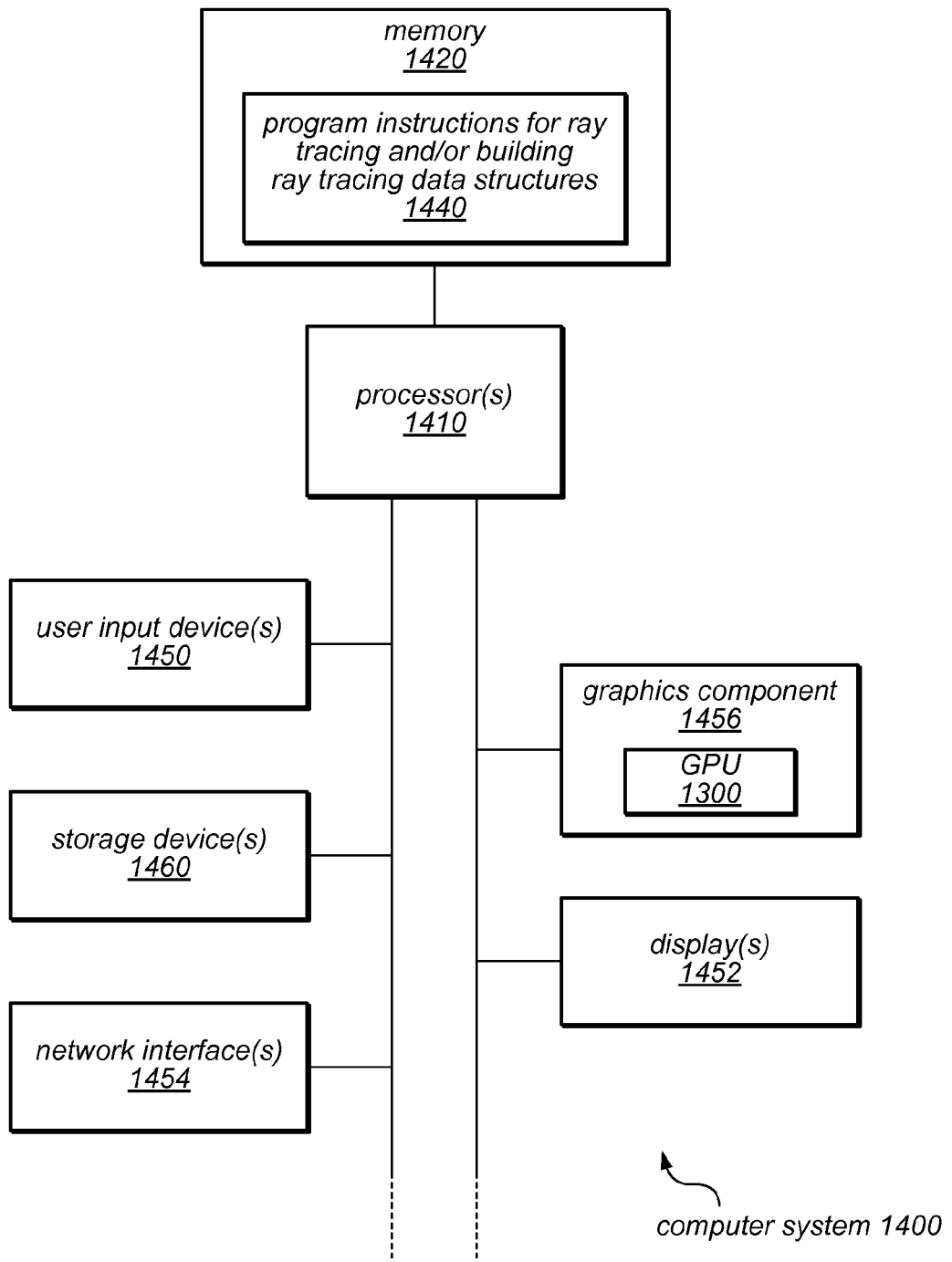
FIG. 14 is a block diagram illustrating constituent elements of a computer system that is configured to implement embodiments of the system and method for ray tracing and/or construction of high quality ray tracing data structures.

FIG. 13 is a diagram illustrating one embodiment of a graphics processing unit (GPU) configured for ray tracing of a scene and/or for building ray tracing data structures. The GPU 1300, also referred to herein as a graphics processor, may comprise a dedicated graphics rendering device associated with a computer system. An example of a suitable computer system 1400 for use with the GPU 1300 is illustrated in FIG. 14. Turning back to FIG. 13, the GPU 1300 may include numerous specialized components configured to optimize the speed of rendering graphics output. For example, the GPU 1300 may include specialized components for rendering three-dimensional models, for applying textures to surfaces, etc. For the sake of illustration, however, only a limited selection of components is shown in the example GPU 1300 of FIG. 13. It is contemplated that GPU architectures other than the example architecture of FIG. 13 may be suitable for implementing the techniques described herein. The GPU 1300 may implement one or more application programmer interfaces (APIs) that permit programmers to invoke the functionality of the GPU. Suitable GPUs may be commercially available from vendors such as NVIDIA Corporation, ATI Technologies, and others.

The GPU 1300 may include a host interface 1360 configured to communicate with a data source 1380 (e.g., a communications bus and/or processor(s) 1410 of a host computer system 1400 or the host system itself). For example, the data source 1380 may provide image input data 1385 (e.g., a scene comprising a plurality of objects in three-dimensional space) and/or executable program code to the GPU 1300. In some embodiments, the host interface 1360 may permit the movement of data in both directions between the GPU 1300 and the data source 1380. The GPU 1300 may also include a display interface 1370 for providing output data to a data target 1390. For example, the data target 1390 may comprise a display device 1452, and the GPU 1300 (along with other graphics components and/or interfaces 1454) may "drive" the display 1452 by providing graphics data, such as a ray traced scene, at a particular rate from a screen buffer (e.g., the image buffer 1350).

In one embodiment, the GPU 1300 may include internal memory 1310. The GPU memory 1310, also referred to herein as "video memory" or "VRAM," may comprise random-access memory (RAM) which is accessible to other GPU components. As will be described in greater detail below, the GPU memory 1310 may be used in some embodiments to store various types of data and instructions such as input data, output data, intermediate data, program instructions for performing various tasks, etc. In one embodiment, the GPU 1300 may also be configured to access memory 1420 of a host computer system 1400 via the host interface 1360.

In one embodiment, program instructions 1440 may be stored in the memory 1420 of the host computer system 1400 and executed by the host computer system 1400 to generate rendered image output 1395 based on the image input 1385. For example, program instructions 1440 may comprise program instructions executable to implement a graphics application (e.g., a 3D game, a CAD program, or a modeling application). In one embodiment, the image input 1385 may include a scene comprising one or more geometric objects in three-dimensional space (e.g., as vertices and associated data in a tessellation), and ray tracing operations may be performed on the GPU 1300. In one embodiment, ray tracing operations may largely be performed using one or more processors of the host computer system, and elements of the ray traced scene may be provided to the GPU 1300. In one embodiment, the image output 1395 may include ray traced output generated according to the techniques described herein.

In one embodiment, the GPU 1300 may include GPU program code 1320 that is executable by the GPU 1300 to perform aspects of the techniques discussed herein. For example, geometric objects in the image input 1385 may be rasterized to pixels by a rasterizer 1321 during a rendering process including execution of the GPU program code 1320 on the GPU 1300. Elements of the GPU program code 1320 may be provided to the GPU 1300 by a host computer system (e.g., the data source 1380) and/or native to the GPU 1300. In one embodiment, the GPU program code 1320 may comprise a data structure builder 1322 (e.g., program instructions executable by GPU 1300 to implement the methods described herein for building ray tracing data structures, such as parallel construction of the sub-trees of the data structure). GPU 1300 may also include a ray tracer 1323 (e.g., program instructions executable by GPU 1300 to implement all or a portion of a ray tracing operation on image input 1385, such as parallel traversal of the sub-trees of the ray tracing data structure). In various embodiments, the GPU program code 1320 may comprise program instructions executable by GPU 1300 to implement other functionality, such as a vertex shader and/or a fragment shader (not shown). In generating the rendered image output 1395, both a vertex shader and a fragment shader may be executed at various points in the graphics pipeline.

The GPU memory 1300 may comprise one or more buffers, and each buffer may comprise a two-dimensional array of pixel data (e.g., color values) and/or pixel metadata (e.g., depth values, stencil values, etc.). As illustrated in FIG. 13, for example, the GPU memory 1310 may comprise an image buffer 1350. The image buffer 1350 may store intermediate or final pixel values generated in the rendering process. In one embodiment, the image buffer 1350 may comprise a single-sampling buffer wherein each pixel in the buffer is represented by a single set of color and alpha values (e.g., one color value for a red channel, one color value for a green channel, one color value for a blue channel, and appropriate values for a one or more alpha channels). In another embodiment, the image buffer 1350 may comprise a multi-sampling buffer usable for automatic anti-aliasing.

FIG. 14 is a diagram illustrating constituent elements of a computer system 900 that is configured to implement embodiments of the system and method for ray tracing with a scene partitioned with discrete oriented planes. The computer system 1400 may include one or more processors 1410 implemented using any desired architecture or chip set, such as the SPARC™ architecture, an x86-compatible architecture from Intel Corporation or Advanced Micro Devices, or an other architecture or chipset capable of processing data. Each of the one or more processors 1410 may include one or more cores. Any desired operating system(s) may be run on the computer system 1400, such as various versions of Unix, Linux, Windows® from Microsoft Corporation, Mac OS® from Apple Inc., or any other operating system that enables the operation of software on a hardware platform. The processor(s) 1410 may be coupled to one or more of the other illustrated components, such as a memory 1420, by at least one communications bus.

In one embodiment, a specialized graphics card or other graphics component 1456 may be coupled to the processor(s) 1410. The graphics component 1456 may include a GPU such as the GPU 1300 illustrated in FIG. 13. Additionally, the computer system 1400 may include one or more imaging devices 1452. The one or more imaging devices 1452 may include various types of raster-based imaging devices such as monitors and printers. In one embodiment, the one or more imaging devices 1452 may comprise one or more display devices 1452 that are coupled to the graphics component 1456 for display of data provided by the graphics component 1456.

In one embodiment, program instructions 1440 that may be executable by the processor(s) 1410 to implement aspects of the ray tracing and/or data structure building techniques described herein may be partly or fully resident within the memory 1420 at the computer system 1400 at any point in time. The memory 1420 may be implemented using any appropriate computer-readable memory medium such as any of various types of ROM or RAM (e.g., DRAM, SDRAM, RDRAM, SRAM, etc.), or combinations thereof. The program instructions may also be stored on a computer-readable storage device or media 1460 accessible from the processor(s) 1410. Any of a variety of storage devices or media 1460 may be used to store the program instructions 1440 in different embodiments, including any desired type of persistent and/or volatile storage devices, such as individual disks, disk arrays, optical devices and associated media (e.g., CD-ROMs, CD-RW drives, DVD-ROMs, DVD-RW drives), flash memory devices, various types of RAM, holographic storage, etc. The storage device(s) 1460 may be coupled to the processor(s) 1410 through one or more storage or I/O interfaces. In some embodiments, the program instructions 1440 may be provided to the computer system 1400 via any suitable computer-readable storage medium including the memory 1420 and storage devices 1460 described above.

The computer system 1400 may also include one or more additional I/O interfaces, such as interfaces for one or more user input devices 1450. In addition, the computer system 1400 may include one or more network interfaces 1454 providing access to a network. It should be noted that one or more components of the computer system 1400 may be located remotely and accessed via the network. The program instructions may be implemented in various embodiments using any desired programming language, scripting language, or combination of programming languages and/or scripting languages, e.g., C, C++, C#, Java™, Perl, etc. It will be apparent to those having ordinary skill in the art that computer system 1400 can also include numerous elements not shown in FIG. 14, as illustrated by the ellipsis shown.

In various embodiments, the elements shown in FIGS. 9-12 may be performed in a different order than the illustrated order. In FIGS. 9-12, any of the operations described in the elements may be performed programmatically (i.e., by a computer according to a computer program). In FIGS. 9-12, any of the operations described in the elements may be performed automatically (i.e., without user intervention).

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
   accessing an initial data structure comprising a plurality of elements that collectively represent a coarse hierarchy of a three-dimensional scene geometry, wherein the scene geometry comprises a plurality of geometric primitives, wherein the coarse hierarchy is not dependent on the locations of the plurality of geometric primitives within a scene represented by the three-dimensional scene geometry, wherein at least one element of the initial data structure represents two or more of the plurality of geometric primitives, and wherein the at least one element comprises information specifying spatial coordinates of a spatial bounding range of the two or more geometric primitives;
   sorting the plurality of elements of the initial data structure into multiple spatial partitions with respect to one or more splitting planes, wherein said sorting is dependent, at least in part, on the spatial coordinates of the spatial bounding range of the at least one element that are specified in the initial data structure, and wherein the at least one element is sorted with respect to the one or more splitting planes without visiting the two or more geometric primitives;
   storing the sorted elements in a ray tracing data structure; and
   solving a ray tracing query for a ray, wherein said solving the ray tracing query comprises traversing the ray tracing data structure to identify a first geometric primitive intersected by the ray.

2. The method of claim 1, wherein the initial data structure comprises a scene graph of the three-dimensional scene.

3. The method of claim 1,
   wherein the method further comprises, prior to said accessing, building the initial data structure, wherein said building comprises:
   scanning data representing the scene geometry;
   designating a pre-determined number of consecutively scanned geometric primitives of the scene geometry as children of the at least one element of the initial data structure;
   determining a bounding volume for the consecutively scanned geometric primitives; and
   storing data representing one or more spatial coordinate values of the determined bounding volume in the at least one element of the initial data structure.

4. The method of claim 1, wherein the at least one element further comprises information representing a count value, wherein the count value indicates the number of geometric primitives represented by the at least one element.

5. The method of claim 1, wherein the ray tracing data structure comprises one of: a k-dimensional tree, a binary space partitioning tree, a k-plane tree, a bounding interval hierarchy, and a fine-grained hierarchical bounding volume tree.

6. The method of claim 1, wherein the spatial bounding range for which the spatial coordinates are specified in the initial data structure represents one of: a bounding box, a bounding sphere, a bounding cylinder, and a discrete oriented polytope.

7. The method of claim 1, wherein each node of the ray tracing data structure encodes an axis and a location of a splitting plane along the axis.

8. The method of claim 1, wherein said sorting comprises sorting an array of pointers to the elements of the initial data structure.

9. The method of claim 1, wherein said sorting comprises performing a hierarchical quicksort of the elements of the initial data structure.

10. The method of claim 1, wherein the multiple spatial partitions are either disjoint or overlapping.

11. The method of claim 1, wherein the ray tracing data structure comprises a plurality of leaf nodes and a plurality of non-leaf nodes, wherein each non-leaf node stores a location of a corresponding splitting plane, an axis of the corresponding plane, and an offset to two child nodes with respect to the corresponding splitting plane.

12. The method of claim 1, wherein the ray tracing data structure comprises a plurality of leaf nodes and a plurality of non-leaf nodes, and wherein each leaf node represents one of the plurality of geometric primitives.

13. The method of claim 2, further comprising:
prior to said accessing, building the scene graph dependent on the three-dimensional scene geometry, and placing a bounding volume at one or more nodes of the scene graph.

14. A non-transitory computer-readable storage medium, storing program instructions, wherein the program instructions are computer-executable to implement: accessing an initial data structure comprising a plurality of elements that collectively represent a coarse hierarchy of a three-dimensional scene geometry, wherein the scene geometry comprises a plurality of geometric primitives, wherein the coarse hierarchy is not dependent on the locations of the plurality of geometric primitives within a scene represented by the three-dimensional scene geometry, wherein at least one element of the initial data structure represents two or more of the plurality of geometric primitives, and wherein the at least one element comprises information representing specifying spatial coordinates of a spatial bounding range of the two or more geometric primitives; sorting the plurality of elements of the initial data structure into multiple spatial partitions with respect to one or more splitting planes, wherein said sorting is dependent, at least in part, on the spatial coordinates of the spatial bounding range of the at least one element that are specified in the initial data structure, and wherein the at least one element is sorted with respect to the one or more splitting planes without visiting the two or more geometric primitives; storing the sorted elements in a ray tracing data structure; and solving a ray tracing query for a ray, wherein said solving the ray tracing query comprises traversing the ray tracing data structure to identify a first geometric primitive intersected by the ray.

15. The non-transitory computer-readable storage medium of claim 14, wherein the initial data structure comprises a scene graph of the three-dimensional scene.

16. The non-transitory computer-readable storage medium of claim 14, wherein the at least one element further comprises information representing a count value, wherein the count value indicates indicating the number of geometric primitives represented by the at least one element.

17. The non-transitory computer-readable storage medium of claim 14, wherein the ray tracing data structure comprises one of: a k-dimensional tree, a binary space partitioning tree, a k-plane tree, a bounding interval hierarchy, and a fine-grained hierarchical bounding volume tree.

18. The non-transitory computer-readable storage medium of claim 14, wherein the spatial bounding range is represented for which the spatial coordinates are specified in the initial data structure represents one of: a bounding box, a bounding sphere, a bounding cylinder, and a discrete oriented polytope.

19. The non-transitory computer-readable storage medium of claim 14, wherein said sorting comprises sorting an array of pointers to the elements of the initial data structure.

20. The non-transitory computer-readable storage medium of claim 14, wherein said sorting comprises performing a hierarchical quicksort of the elements of the initial data structure.

21. The non-transitory computer-readable storage medium of claim 14, wherein the program instructions are further executable to implement: prior to said accessing, building the initial data structure dependent on the three-dimensional scene geometry, wherein said building comprises: scanning data representing the scene geometry; designating a pre-determined number of consecutively scanned geometric primitives of the scene geometry as children of the at least one element of the initial data structure; determining a bounding volume for the consecutively scanned geometric primitives; and storing data representing one or more spatial coordinate values of the determined bounding volume in the at least one element of the initial data structure.

22. A system, comprising:
a processor; and
a memory coupled to the processor, wherein the memory stores program instructions executable by the processor to implement:
accessing an initial data structure comprising a plurality of elements that collectively represent a coarse hierarchy of a three-dimensional scene geometry, wherein the scene geometry comprises a plurality of geometric primitives, wherein the coarse hierarchy is not dependent on the locations of the plurality of geometric primitives within a scene represented by the three-dimensional scene geometry, wherein at least one element of the initial data structure represents two or more of the plurality of geometric primitives, and wherein the at least one element comprises information specifying spatial coordinates of a spatial bounding range of the two or more geometric primitives;
sorting the plurality of elements of the initial data structure into multiple spatial partitions with respect to one or more splitting planes, wherein said sorting is dependent, at least in part, on the spatial coordinates of the spatial bounding range of the at least one element that are specified in the initial data structure, and wherein the at least one element is sorted with respect to the one or more splitting planes without visiting the two or more geometric primitives;
storing the sorted elements in a ray tracing data structure; and
solving a ray tracing query for a ray, wherein said solving the ray tracing query comprises traversing the ray tracing data structure to identify a first geometric primitive intersected by the ray.

23. The system of claim 22, wherein the initial data structure comprises a scene graph of the three-dimensional scene.

24. The system of claim 22, wherein the at least one element further comprises information representing a count value, wherein the count value indicates the number of geometric primitives represented by the at least one element.

25. The system of claim 22, wherein the ray tracing data structure comprises one of: a k-dimensional tree, a binary space partitioning tree, a k-plane tree, a bounding interval hierarchy, and a fine-grained hierarchical bounding volume tree.

26. The system of claim 22, wherein the spatial bounding range is for which the spatial coordinates are specified in the initial data structure represents one of: a bounding box, a bounding sphere, a bounding cylinder, and a discrete oriented polytope.

27. The system of claim 22, wherein said sorting comprises sorting an array of pointers to the elements of the initial data structure.

28. The system of claim 22, wherein said sorting comprises performing a hierarchical quicksort of the elements of the initial data structure.

29. The system of claim 23, wherein the program instructions are further executable to implement:

prior to said accessing, building the scene graph dependent on the three-dimensional scene geometry, and placing a bounding volume at one or more nodes of the scene graph.

30. The system of claim 22, wherein the processor comprises a graphics processing unit (GPU).

* * * * *